United States Patent
Frey et al.

(10) Patent No.: US 12,440,276 B2
(45) Date of Patent: Oct. 14, 2025

(54) SYSTEMS AND METHODS FOR PRESURGICAL PLANNING

(71) Applicant: Mighty Oak Medical, Inc., Englewood, CO (US)

(72) Inventors: George Frey, Englewood, CO (US); Caleb Voelkel, West Glover, VT (US); Tyler Drumm, Englewood, CO (US); Nicholas Hobson, Englewood, CO (US)

(73) Assignee: Mighty Oak Medical, Inc., Englewood, CO (US)

( * ) Notice: Subject to any disclaimer, the term of this patent is extended or adjusted under 35 U.S.C. 154(b) by 0 days.

(21) Appl. No.: 18/605,613

(22) Filed: Mar. 14, 2024

(65) Prior Publication Data
US 2024/0374314 A1 Nov. 14, 2024

Related U.S. Application Data

(60) Provisional application No. 63/452,076, filed on Mar. 14, 2023.

(51) Int. Cl.
| | |
|---|---|
| *A61B 34/10* | (2016.01) |
| *G16H 20/40* | (2018.01) |
| *G16H 50/50* | (2018.01) |

(52) U.S. Cl.
CPC ............. *A61B 34/10* (2016.02); *G16H 20/40* (2018.01); *G16H 50/50* (2018.01); *A61B 2034/105* (2016.02)

(58) Field of Classification Search
None
See application file for complete search history.

(56) References Cited

U.S. PATENT DOCUMENTS

| | | |
|---|---|---|
| 3,151,392 A | 10/1964 | Chambers |
| 5,098,383 A | 3/1992 | Hemmy et al. |
| 5,201,734 A | 4/1993 | Cozad et al. |
| D359,557 S | 6/1995 | Hayes |
| 5,490,409 A | 2/1996 | Weber |

(Continued)

FOREIGN PATENT DOCUMENTS

| | | |
|---|---|---|
| CA | 2736525 | 3/2010 |
| CA | 2862341 | 8/2013 |

(Continued)

OTHER PUBLICATIONS

Naik et al. "A Hybrid 3D-2D Image Registration Framework for Pedicle Screw Trajectory Registration between Intraoperative X-ray Image and Preoperative CT Image". J Imaging. Jul. 6, 2022;8(7) (Year: 2022).*

(Continued)

*Primary Examiner* — Jonathan Ng
(74) *Attorney, Agent, or Firm* — FisherBroyles, LLP; Ian R. Walsworth; Craig W. Mueller

(57) ABSTRACT

Systems and methods for providing surgical planning are described in this application. In varying aspects, patient-specific instrument, guides or implants used in the surgical procedure may comprise multiple patient-specific surfaces for mating with the patient's anatomy. The methods preferably include precise manipulation of a patient's anatomy that includes orientation, depth, placement and other criteria for instruments, guides and implants used during a surgical procedure.

5 Claims, 4 Drawing Sheets

(56) References Cited

U.S. PATENT DOCUMENTS

| | | |
|---|---|---|
| 5,527,312 A | 6/1996 | Ray |
| 5,569,246 A | 10/1996 | Ojima et al. |
| 5,733,284 A | 3/1998 | Martin |
| D403,066 S | 12/1998 | DeFonzo |
| 5,865,846 A | 2/1999 | Bryan et al. |
| D412,032 S | 7/1999 | Mikula-Curtis et al. |
| 5,993,453 A | 11/1999 | Bullara et al. |
| 6,006,581 A | 12/1999 | Holmes |
| D420,132 S | 2/2000 | Bucholz et al. |
| 6,030,401 A | 2/2000 | Marino |
| 6,035,691 A | 3/2000 | Lin et al. |
| 6,063,088 A | 5/2000 | Winslow |
| D428,989 S | 8/2000 | Segermark et al. |
| 6,113,602 A | 9/2000 | Sand |
| 6,142,998 A | 11/2000 | Smith et al. |
| 6,221,077 B1 | 4/2001 | Rinner et al. |
| 6,290,724 B1 | 9/2001 | Marino |
| 6,309,395 B1 | 10/2001 | Smith et al. |
| 6,328,738 B1 | 12/2001 | Suddaby |
| 6,342,056 B1 | 1/2002 | Mac-Thiong |
| 6,364,880 B1 | 4/2002 | Michelson |
| 6,644,087 B1 | 11/2003 | Ralph et al. |
| 6,711,432 B1 | 3/2004 | Krause et al. |
| 6,719,795 B1 | 4/2004 | Cornwall et al. |
| 6,755,839 B2 | 6/2004 | Van Hoeck et al. |
| 7,014,640 B2 | 3/2006 | Kemppanien et al. |
| 7,025,769 B1 | 4/2006 | Ferree |
| 7,077,864 B2 | 7/2006 | Byrd, III et al. |
| D532,515 S | 11/2006 | Buttler et al. |
| D533,664 S | 12/2006 | Buttler et al. |
| 7,207,992 B2 | 4/2007 | Ritland |
| 7,235,076 B2 | 6/2007 | Pacheco |
| 7,288,093 B2 | 10/2007 | Michelson |
| 7,341,590 B2 | 3/2008 | Ferree |
| 7,387,643 B2 | 6/2008 | Michelson |
| 7,406,775 B2 | 8/2008 | Funk et al. |
| 7,454,939 B2 | 11/2008 | Garner et al. |
| 7,491,180 B2 | 2/2009 | Pacheco |
| 7,559,931 B2 | 7/2009 | Stone |
| 7,623,902 B2 | 11/2009 | Pacheco |
| D606,195 S | 12/2009 | Eisen et al. |
| 7,658,610 B2 | 2/2010 | Knopp |
| D618,796 S | 6/2010 | Cantu et al. |
| 7,844,356 B2 | 11/2010 | Matov et al. |
| 7,955,355 B2 | 6/2011 | Cin |
| 7,957,824 B2 | 6/2011 | Boronvinskih et al. |
| 7,957,831 B2 | 6/2011 | Isaacs |
| 7,967,868 B2 | 6/2011 | White et al. |
| D642,263 S | 7/2011 | Park |
| D649,245 S | 11/2011 | Klebs |
| 8,057,482 B2 | 11/2011 | Stone et al. |
| 8,070,752 B2 | 12/2011 | Metzger et al. |
| 8,092,465 B2 | 1/2012 | Metzger et al. |
| 8,118,815 B2 | 2/2012 | van der Walt |
| 8,159,753 B2 | 4/2012 | Ojeda et al. |
| 8,167,884 B2 | 5/2012 | Pacheco |
| 8,175,683 B2 | 5/2012 | Roose |
| 8,206,396 B2 | 6/2012 | Trabish |
| 8,214,014 B2 | 7/2012 | Pacheco |
| 8,236,006 B2 | 8/2012 | Hamada |
| 8,241,293 B2 | 8/2012 | Stone |
| 8,257,083 B2 | 9/2012 | Berckmans et al. |
| D669,176 S | 10/2012 | Frey |
| D669,984 S | 10/2012 | Cheney et al. |
| 8,277,461 B2 | 10/2012 | Pacheco |
| 8,282,646 B2 | 10/2012 | Schoenefeld |
| 8,298,235 B2 | 10/2012 | Grinberg |
| 8,298,237 B2 | 10/2012 | Schoenefeld |
| 8,298,242 B2 | 10/2012 | Justis et al. |
| D672,038 S | 12/2012 | Frey |
| 8,357,111 B2 | 1/2013 | Caillouette et al. |
| 8,377,066 B2 | 2/2013 | Katrana et al. |
| 8,407,067 B2 | 3/2013 | Ulthgenannt et al. |
| 8,419,740 B2 | 4/2013 | Aram et al. |
| D685,087 S | 6/2013 | Voic |
| 8,460,303 B2 | 6/2013 | Park |
| 8,480,679 B2 | 7/2013 | Park et al. |
| 8,535,387 B2 | 9/2013 | Meridew et al. |
| 8,540,719 B2 | 9/2013 | Peukert et al. |
| D691,719 S | 10/2013 | Park |
| 8,545,509 B2 | 10/2013 | Park et al. |
| 8,549,888 B2 | 10/2013 | Isaacs |
| 8,568,487 B2 | 10/2013 | Witt et al. |
| 8,591,516 B2 | 11/2013 | Metzger et al. |
| 8,603,180 B2 | 12/2013 | White et al. |
| 8,607,603 B2 | 12/2013 | Justis et al. |
| 8,608,748 B2 | 12/2013 | Metzger et al. |
| 8,608,749 B2 | 12/2013 | Witt et al. |
| 8,632,547 B2 | 1/2014 | Metzger et al. |
| 8,668,700 B2 | 3/2014 | Catanzarite |
| D705,929 S | 5/2014 | Frey |
| 8,721,651 B2 | 5/2014 | Loke et al. |
| 8,758,357 B2 | 6/2014 | Frey |
| 8,808,302 B2 | 8/2014 | White et al. |
| 8,808,303 B2 | 8/2014 | Stemniski et al. |
| 8,858,561 B2 | 10/2014 | White et al. |
| 8,864,769 B2 | 10/2014 | Stone et al. |
| 8,870,889 B2 | 10/2014 | Frey |
| D718,862 S | 12/2014 | Matheny |
| D718,863 S | 12/2014 | Matheny |
| D718,864 S | 12/2014 | Matheny |
| 8,979,749 B2 | 3/2015 | Gorek et al. |
| 8,992,538 B2 | 3/2015 | Keefer |
| D726,914 S | 4/2015 | Matheny |
| 9,017,412 B2 | 4/2015 | Wolters et al. |
| 9,044,285 B2 | 6/2015 | Harper |
| 9,066,727 B2 | 6/2015 | Catanzarite et al. |
| 9,066,816 B2 | 6/2015 | Allard et al. |
| 9,113,971 B2 | 8/2015 | Metzger et al. |
| D738,498 S | 9/2015 | Frey et al. |
| 9,138,325 B2 | 9/2015 | Mouw |
| 9,173,661 B2 | 11/2015 | Metzger et al. |
| 9,192,446 B2 | 11/2015 | Piferi |
| D745,671 S | 12/2015 | Frey et al. |
| D745,672 S | 12/2015 | Frey et al. |
| D745,673 S | 12/2015 | Frey et al. |
| 9,198,678 B2 | 12/2015 | Frey et al. |
| D747,480 S | 1/2016 | Geebelen |
| D747,481 S | 1/2016 | Geebelen |
| 9,289,253 B2 | 3/2016 | Sweeney |
| 9,451,973 B2 | 9/2016 | Heilman |
| 9,486,324 B2 | 11/2016 | Hochschuler |
| D775,335 S | 12/2016 | Frey et al. |
| 9,642,633 B2 | 5/2017 | Frey et al. |
| 9,649,160 B2 | 5/2017 | van der Walt et al. |
| 9,662,157 B2 | 5/2017 | Schneider et al. |
| 9,675,400 B2 | 6/2017 | Katrana et al. |
| 9,737,339 B2 | 8/2017 | Copp et al. |
| 9,814,497 B1 | 11/2017 | Al-Habib et al. |
| 9,826,991 B2 | 11/2017 | Kaiser et al. |
| 9,839,448 B2 | 12/2017 | Reckling et al. |
| 9,848,922 B2 | 12/2017 | Tohmeh et al. |
| 9,913,669 B1 | 3/2018 | Scholl et al. |
| 9,949,843 B2 | 4/2018 | Reiley et al. |
| 9,968,408 B1 | 5/2018 | Casey et al. |
| 9,987,024 B2 | 6/2018 | Frey et al. |
| 10,085,784 B2 | 10/2018 | Ono et al. |
| 10,166,033 B2 | 1/2019 | Keiley et al. |
| D857,893 S | 8/2019 | Frey |
| D858,765 S | 9/2019 | Frey |
| D895,111 S | 9/2020 | Frey |
| 11,039,889 B2 | 6/2021 | Frey |
| 2004/0097925 A1 | 5/2004 | Boehm et al. |
| 2004/0144149 A1 | 7/2004 | Strippgen et al. |
| 2004/0243481 A1 | 12/2004 | Bradbury et al. |
| 2005/0148843 A1 | 7/2005 | Roose |
| 2005/0177156 A1 | 8/2005 | Timm et al. |
| 2005/0262911 A1 | 12/2005 | Dankowicz et al. |
| 2006/0058792 A1 | 3/2006 | Hynes |
| 2006/0084986 A1 | 4/2006 | Grinberg et al. |
| 2006/0095044 A1 | 5/2006 | Grady, Jr. et al. |
| 2006/0149375 A1 | 7/2006 | Yuan et al. |
| 2006/0241385 A1 | 10/2006 | Dietz |
| 2007/0227216 A1 | 10/2007 | Schalliol |

(56) References Cited

U.S. PATENT DOCUMENTS

| | | |
|---|---|---|
| 2007/0288030 A1 | 12/2007 | Metzger et al. |
| 2008/0086127 A1 | 4/2008 | Patterson et al. |
| 2008/0114370 A1 | 5/2008 | Schoenefeld |
| 2008/0161815 A1 | 7/2008 | Schoenefeld et al. |
| 2008/0183214 A1 | 7/2008 | Copp et al. |
| 2008/0255564 A1 | 10/2008 | Michelson |
| 2008/0257363 A1 | 10/2008 | Schoenefeld et al. |
| 2008/0275452 A1 | 11/2008 | Lang et al. |
| 2008/0287954 A1 | 11/2008 | Kunz |
| 2008/0306552 A1 | 12/2008 | Winslow |
| 2008/0312659 A1 | 12/2008 | Metzger et al. |
| 2008/0319491 A1 | 12/2008 | Schoenefeld |
| 2009/0024131 A1 | 1/2009 | Metzger |
| 2009/0076555 A1 | 3/2009 | Lowry et al. |
| 2009/0087276 A1 | 4/2009 | Rose |
| 2009/0088674 A1 | 4/2009 | Caillouette et al. |
| 2009/0088761 A1 | 4/2009 | Roose et al. |
| 2009/0088763 A1 | 4/2009 | Aram et al. |
| 2009/0093816 A1 | 4/2009 | Roose et al. |
| 2009/0099567 A1 | 4/2009 | Zajac |
| 2009/0105760 A1 | 4/2009 | Frey |
| 2009/0110498 A1 | 4/2009 | Park |
| 2009/0138020 A1 | 5/2009 | Park et al. |
| 2009/0187194 A1 | 7/2009 | Hamada |
| 2009/0198277 A1 | 8/2009 | Gordon et al. |
| 2009/0254093 A1 | 10/2009 | White et al. |
| 2009/0270868 A1 | 10/2009 | Park et al. |
| 2009/0326537 A1 | 12/2009 | Anderson |
| 2010/0016984 A1 | 1/2010 | Trabish |
| 2010/0049195 A1 | 2/2010 | Park et al. |
| 2010/0082035 A1 | 4/2010 | Keefer |
| 2010/0087829 A1 | 4/2010 | Metzger et al. |
| 2010/0100193 A1 | 4/2010 | White |
| 2010/0152782 A1 | 6/2010 | Stone et al. |
| 2010/0185204 A1 | 7/2010 | Buttermann et al. |
| 2010/0191244 A1 | 7/2010 | White et al. |
| 2010/0217270 A1 | 8/2010 | Polinski et al. |
| 2010/0217336 A1 | 8/2010 | Crawford et al. |
| 2010/0305700 A1 | 12/2010 | Ben-Arye et al. |
| 2010/0324692 A1 | 12/2010 | Uthgenannt et al. |
| 2011/0015636 A1 | 1/2011 | Katrana et al. |
| 2011/0015639 A1 | 1/2011 | Metzger et al. |
| 2011/0046628 A1 | 2/2011 | Jamali |
| 2011/0046735 A1 | 2/2011 | Metzger et al. |
| 2011/0054478 A1 | 3/2011 | Vanasse et al. |
| 2011/0071533 A1 | 3/2011 | Metzger et al. |
| 2011/0093023 A1 | 4/2011 | Lee et al. |
| 2011/0093086 A1 | 4/2011 | Witt et al. |
| 2011/0160736 A1 | 6/2011 | Meridew et al. |
| 2011/0160867 A1 | 6/2011 | Meridew et al. |
| 2011/0166578 A1 | 7/2011 | Stone et al. |
| 2011/0184419 A1 | 7/2011 | Meridew et al. |
| 2011/0184526 A1 | 7/2011 | White et al. |
| 2011/0190899 A1 | 8/2011 | Pierce et al. |
| 2011/0213376 A1 | 9/2011 | Maxson et al. |
| 2011/0218545 A1 | 9/2011 | Catanzarite et al. |
| 2011/0224674 A1 | 9/2011 | White et al. |
| 2011/0288433 A1 | 11/2011 | Kelleher et al. |
| 2011/0319745 A1 | 12/2011 | Frey |
| 2012/0041445 A1 | 2/2012 | Roose et al. |
| 2012/0130434 A1 | 5/2012 | Stemniski et al. |
| 2012/0150243 A9 | 6/2012 | Crawford et al. |
| 2012/0179259 A1 | 7/2012 | McDonough et al. |
| 2012/0215315 A1 | 8/2012 | Hochschuler et al. |
| 2012/0226283 A1 | 9/2012 | Meridew |
| 2012/0245587 A1 | 9/2012 | Fang |
| 2013/0006251 A1 | 1/2013 | Aram et al. |
| 2013/0053854 A1 | 2/2013 | Schoenefeld et al. |
| 2013/0110174 A1 | 5/2013 | Marik |
| 2013/0123850 A1 | 5/2013 | Schoenefeld et al. |
| 2013/0218163 A1 | 8/2013 | Frey |
| 2014/0137618 A1 | 5/2014 | Isaacs |
| 2014/0350614 A1 | 11/2014 | Frey |
| 2014/0379032 A1 | 12/2014 | Hennard |
| 2015/0047410 A1 | 2/2015 | Petit et al. |
| 2015/0127053 A1 | 5/2015 | Maruenda Paulino et al. |
| 2015/0297249 A1 | 10/2015 | Catanzarite |
| 2016/0030067 A1 | 2/2016 | Frey et al. |
| 2016/0270802 A1 | 9/2016 | Fang et al. |
| 2017/0215857 A1 | 8/2017 | D'Urso |
| 2017/0312032 A1 | 11/2017 | Amanatullah |
| 2018/0082480 A1 | 3/2018 | White |
| 2018/0168740 A1 | 6/2018 | Ryan |
| 2018/0271602 A1 | 9/2018 | Frey |
| 2019/0069956 A1* | 3/2019 | Ryan .................... G16H 50/50 |
| 2020/0138519 A1 | 5/2020 | Frey |
| 2020/0360105 A1 | 11/2020 | Frey |
| 2023/0071033 A1* | 3/2023 | Ehlke .................... A61B 34/25 |
| 2023/0363825 A1* | 11/2023 | Davis .................... A61B 34/20 |
| 2023/0368465 A1* | 11/2023 | Mahfouz ................ G06T 19/20 |
| 2024/0265667 A1* | 8/2024 | Luciano ................ G06V 20/70 |
| 2024/0374389 A1* | 11/2024 | Casey .................... B33Y 80/00 |
| 2025/0078269 A1* | 3/2025 | Weede .................. A61B 34/20 |

FOREIGN PATENT DOCUMENTS

| | | |
|---|---|---|
| CN | 201275138 | 7/2009 |
| CN | 201404283 | 2/2010 |
| CN | 101390773 | 11/2010 |
| CN | 101390773 B | 11/2010 |
| CN | 101953713 | 1/2011 |
| CN | 101953713 B | 5/2012 |
| CN | 104306061 | 1/2015 |
| CN | 105078563 | 11/2015 |
| CN | 106175911 | 12/2016 |
| CN | 104224306 | 8/2017 |
| DE | 102013110699 | 4/2015 |
| DE | 202014011170 U1 | 4/2018 |
| EM | 006192001-001 | 4/2019 |
| EM | 006192001-002 | 4/2019 |
| EM | 006192001-003 | 4/2019 |
| EM | 006192001-004 | 4/2019 |
| EM | 006192001-005 | 4/2019 |
| EM | 006192001-006 | 4/2019 |
| EP | 0908836 A2 | 4/1999 |
| EP | 2168507 | 3/2010 |
| EP | 2957244 | 12/2015 |
| EP | 2749235 | 8/2017 |
| EP | 3381382 | 10/2018 |
| FR | 3012030 | 12/2015 |
| FR | 3023655 | 4/2018 |
| GB | 2447702 | 9/2008 |
| JP | 2006-528533 | 12/2006 |
| JP | 2008-514362 | 5/2008 |
| JP | 2012-143379 | 8/2012 |
| JP | D1508406 | 10/2014 |
| KR | 200382165 Y1 | 4/2005 |
| WO | WO2001037728 | 8/2002 |
| WO | WO2004071314 | 8/2004 |
| WO | WO2006039266 | 4/2006 |
| WO | WO2007145937 | 12/2007 |
| WO | WO2008027549 | 3/2008 |
| WO | WO2009004625 | 1/2009 |
| WO | WO2009035358 | 3/2009 |
| WO | WO2006017641 | 4/2009 |
| WO | WO2008157412 | 4/2009 |
| WO | WO2009129063 | 10/2009 |
| WO | WO2009105106 | 12/2009 |
| WO | WO2010033431 | 3/2010 |
| WO | WO2010148103 | 12/2010 |
| WO | WO2011041398 | 4/2011 |
| WO | WO2011080260 | 7/2011 |
| WO | WO2011106711 | 9/2011 |
| WO | WO2011109260 | 9/2011 |
| WO | WO2012082164 | 6/2012 |
| WO | WO2012152900 | 11/2012 |
| WO | WO2013041618 | 3/2013 |
| WO | WO2013104682 | 7/2013 |
| WO | WO2013169674 | 11/2013 |
| WO | WO2013173700 | 11/2013 |
| WO | WO2014070889 | 5/2014 |
| WO | WO2014088801 | 6/2014 |
| WO | WO2014090908 | 6/2014 |
| WO | WO2014095853 | 6/2014 |

(56) References Cited

FOREIGN PATENT DOCUMENTS

| WO | WO2014143762 | 9/2014 |
|---|---|---|
| WO | WO2014198279 | 12/2014 |
| WO | WO2016148675 | 9/2016 |

OTHER PUBLICATIONS

Brussel et al. "Medical Image-Based Design of an Individualized Surgical Guide for Pedicle Screw Insertion." 18th Annual International Conference of the IEEE Engineering in Medicine and Biology Society, Amsterdam 1996, pp. 225-226.
Dai et al. "Surgical treatment of the osteoporotic spine with bone cement-injectable cannulated pedicle screw fixation: technical description and preliminary application in 43 patients," Clinics, Feb. 2015, vol. 70, No. 2, pp. 114-119.
Examination Report for IN201617045149. Jun. 12, 2020. 5 pages.
Examination Report for IN20182701734. Jun. 23, 2020. 6 pages.
Examination Report No. 1 for AU2016338436. Sep. 22, 2020. 6 pages.
Examiner Requisition for CA3001898. Jan. 7, 2020. 3 pages.
Extended Search Report for European Patent Application No. 11804191.2, dated May 7, 2015. 8 pages.
Extended Search Report for European Patent Application No. 13778164.7, dated Feb. 17, 2016. 10 pages.
Hong et al. "Binder-jetting 3D printing and alloy development of new biodegradable Fe—Mn—Ca/Mg alloys," Acta Biomaterialia, Nov. 2016, vol. 45, pp. 375-386 (Abstract only) 4 pages.
International Preliminary Report on Patentability for International (PCT) Patent Application No. PCT/US11/42412 mailed Jan. 17, 2013, 7 pages.
International Preliminary Report on Patentability for International Patent Application No. PCT/US2013/036535, mailed Oct. 30, 2014, 7 pages.
International Preliminary Report on Patentability for International Patent Application No. PCT/US2014/041379, mailed Dec. 17, 2015, 6 pages.
International Preliminary Report on Patentability for International Patent Application No. PCT/US2015/032356, mailed Dec. 15, 2016, 7 pages.
International Search Report and Written Opinion for International Patent Application No. PCT/US11/42412 mailed Nov. 8, 2011.
International Search Report and Written Opinion for International Patent Application No. PCT/US15/32356, mailed Oct. 28, 2015, 10 pages.
International Search Report and Written Opinion for International Patent Application No. PCT/US2013/036535, mailed Jun. 26, 2013, 8 pages.
International Search Report and Written Opinion for International Patent Application No. PCT/US2014/041379, mailed Oct. 28, 2014, 7 pages.
International Search Report and Written Opinion for International Patent Application No. PCT/US2016/056970, mailed Mar. 10, 2017, 13 pages.
Introducing IntelliSense Drill Technology®, McGinley Orthopaedic Innovations, 1 page, [captured Feb. 29, 2016 from: http://web.archive.org/web/20160229042028/http://www.mcginleyorthopaedicinnovations.com/index.php?/pages/drill].
Jakus et al. "Hyperelastic "bone": A highly versatile, growth factor-free, osteoregenerative, scalable, and surgically friendly biomaterial," Science Translational Medicine, Sep. 2016, vol. 8, No. 358, pp. 358ra127 (Abstract only) 5 pages.
Lu et al. "A novel computer-assisted drill guide template for lumbar pedicle screw placement: a cadaveric and clinical study." The International Journal of Medical Robotics and Computer Assisted Surgery, Jun. 2009, vol. 5, No. 2, pp. 184-191. (Abstract Only).
Lu et al. "A Novel Patient-Specific Navigational Template for Cervical Pedicle Screw Placement," Spine, Dec. 15, 2009, vol. 34, No. 26, pp. E959-E966 (Abstract Only).
Notice of Allowance for U.S. Appl. No. 13/172,683 mailed Apr. 23, 2014., 7 pages.
Notice of Allowance for U.S. Appl. No. 13/841,069, mailed Sep. 18, 2014. 7 pages.
Notice of Allowance for U.S. Appl. No. 14/298,624, mailed Oct. 7, 2015. 7 pages.
Notice of Allowance for U.S. Appl. No. 14/883,299, mailed Mar. 20, 2017. 12 pages.
Notice of Allowance for U.S. Appl. No. 29/409,734, mailed May 11, 2012. 8 pages.
Notice of Allowance for U.S. Appl. No. 29/427,918, mailed Oct. 15, 2012. 9 pages.
Notice of Allowance for U.S. Appl. No. 29/432,668 mailed Nov. 27, 2013. 11 pages.
Notice of Allowance for U.S. Appl. No. 29/476,699, mailed Oct. 2, 2015. 8 pages.
Notice of Allowance for U.S. Appl. No. 29/476,705, mailed Oct. 7, 2015. 8 pages.
Notice of Allowance for U.S. Appl. No. 29/476,709, mailed Nov. 6, 2015. 8 pages.
Notice of Allowance for U.S. Appl. No. 29/496,231, mailed Jul. 23, 2015. 10 pages.
Notice of Allowance for U.S. Appl. No. 29/538,633, mailed Jan. 6, 2016. 10 pages.
Notice of Allowance with English Translation for Japan Patent Application No. 2013-518663, mailed Dec. 8, 2015. 4 pages.
Notice off Allowance with English Translation for Japan Patent Application No. 2015-507078, mailed Jan. 10, 2017. 4 pages.
Office Action in BR112018007443-8. Jun. 9, 2020. 4 pages.
Official Action for Australian Patent Application No. 2011276468 dated Apr. 10, 2013, 3 Pages.
Official Action for Canada Patent Application No. 2,802,094, dated Feb. 14, 2017, 4 pages.
Official Action for Canada Patent Application No. 2,914,005, mailed Feb. 3, 2017, 3 pages.
Official Action for China Patent Application No. 201180029692.7, mailed Oct. 8, 2014 12 pages.
Official Action for European Patent Application No. 11804191.2, dated Feb. 17, 2017, 5 pages.
Official Action for U.S. Appl. No. 13/172,683, mailed Feb. 24, 2014, 10 pages.
Official Action for U.S. Appl. No. 13/172,683, mailed Sep. 10, 2013 7 pages.
Official Action for U.S. Appl. No. 13/841,069 mailed Jul. 8, 2014, 6 pages.
Official Action for U.S. Appl. No. 13/841,069, mailed Jul. 31, 2014 9 pages.
Official Action for U.S. Appl. No. 14/298,634, mailed Apr. 27, 2015 8 pages.
Official Action for U.S. Appl. No. 14/298,634, mailed Jul. 7, 2015 6 pages.
Official Action with English Translation for China Patent Application No. 201380030638.3, dated Feb. 4, 2017. 6 pages.
Official Action with English Translation for China Patent Application No. 201380030638.3, dated May 25, 2016. 11 pages.
Official Action with English Translation for Japan Patent Application No. 2013-518663, mailed May 12, 2015. 4 pages.
Official Action with English Translation for Russia Patent Application No. 2014143528/14, dated Jan. 13, 2017. 8 pages.
Owen et al. "Rapid prototype patient-specific drill template for cervical pedicle screw placement." Computer Aided Surgery, Sep. 2007, vol. 12, No. 5, pp. 303-308 (Abstract Only).
Partial Search Report for European Patent Application No. 11804191.2, dated Jan. 20, 2015 6 pages.
Ryken et al. "Image-based drill templates for cervical pedicle screw placement Laboratory investigation," Journal of Neurosurgery, Jan. 2009, vol. 10, No. 1 (Abstract Only).
Translated Office Action from Japanese Patent Application No. 2018-519856. Oct. 6, 2020. 3 pages.
Yin et al. "Computer aid designed digital targeting template of pedicle of vertebral arch for atlantoaxial nailing," IT in Medicine & Education, 2009. ITIME '09. Aug. 14-16, 2009, vol. 1 (Abstract Only).

(56) References Cited

OTHER PUBLICATIONS

S. Lu, et al., A Novel Computer-Assisted Drill Guide Template for Lumbar Pedicle Screw Placement: A Cadaveric and Clinical Study, 5 Int. J. Med. Robotics Comput. Surg. 184-191 (2009).

S. Lu, et al., A Novel Patient-Specific Template for Cervical Pedicle Screw Placement, 34 Spine E9595-E964 (2009).

Lu et al., A novel computer-assisted drill guide template for placement of C2 laminar screws, E. Spine J., 1379-1385 (2009).

T. Ryken, et al., Image-Based Drill Templates for Cervical Pedicle Screw Placement, 10 J. Neurosurg. Spine 21-26 (2009).

Owen et al., Rapid Prototype Patient Specific Drill Template for Cervical Pedicle Screw Placement (2007).

K. Radermacher, et al., Technique for Better Execution of CT Scan Planned Orthopedic Surgery on Bone Structures, Comp. Assisted Radiology: Proceedings of the Int'l Symposium on Comp. & Comm. Sys. for Image Guided Diagnosis & Therapy (1995).

International Patent Application Publication No. WO 1993/025157, filed by K. Radermacher et al. on Jun. 17, 1993.

K. Radermacher, et al., Image Guided Orthopedic Surgery Using Individual Templates, Image Guided Orthopedic Surgery (1997).

K. Radermacher, et al., Computer Assisted Orthopaedic Surgery With Image Based Individual Templates, 354 Clinical Orthopaedics & Related Res. 28 (1998).

Van Brussel et al., Medical Image-Based Design of an Individualized Surgical Guide for Pedicle Screw Insertion (1996).

Birnbaum et al., Computer-Assisted Orthopedic Surgery with Individual Templates and Comparison to Conventional Operation Method (2001).

Berry et al., Personalized image-based templates for intra-operative guidance, J. Engineering in Medicine, 219:111-118 (2005).

Salako, et al., "Feasibility Study of Patient-Specific Surgical Templates for Fixation of Pedicle Screws," Stud Health Technol Inform. 2002;88:419-22 (2002).

Zhang et al., Application of Navigation Template to Fixation of Sacral Fracture Using Three-Dimensional Reconstruction and Reverse Engineering Technique (2009), which was published on Aug. 2009.

\* cited by examiner

SYSTEMS AND METHODS FOR PRESURGICAL PLANNING

CROSS REFERENCE TO RELATED APPLICATIONS

This application claims priority under 35 U.S.C. § 119(e) to U.S. Provisional Patent Application Ser. No. 63/452,076 filed Mar. 14, 2023. This application is also a continuation-in-part of U.S. patent application Ser. No. 18/502,667 filed on Nov. 6, 2023, which in turn is a continuation of U.S. patent application Ser. No. 17/402,512 filed on Aug. 14, 2021, now issued as U.S. Pat. No. 11,806,197, which in turn is a continuation of U.S. patent application Ser. No. 16/831,215 filed on Mar. 26, 2020, now issued as U.S. Pat. No. 11,633,254, which claims priority under 35 U.S.C. § 119(e) to U.S. Provisional Patent Application Ser. No. 62/823,911 filed Mar. 26, 2019. U.S. patent application Ser. No. 16/831,215 is a also continuation-in-part of U.S. patent application Ser. No. 16/598,861 filed on Oct. 10, 2019, now issued as U.S. Pat. No. 11,376,073, which claims priority under 35 U.S.C. § 119(e) to U.S. Provisional Application Ser. No. 62/743,661 filed Oct. 10, 2018, and which is also a continuation-in-part of U.S. patent application Ser. No. 15/997,404 filed Jun. 4, 2018, now issued as U.S. Pat. No. 11,039,889, which is a continuation-in-part of U.S. patent application Ser. No. 15/416,975 filed on Jan. 26, 2017, now issued as U.S. Pat. No. 9,987,024, which in turn is a continuation-in-part of U.S. patent application Ser. No. 14/883,299 filed Oct. 14, 2015, now issued as U.S. Pat. No. 9,642,633, and claims priority under 35 U.S.C. § 119(e) to U.S. Provisional Patent Application 62/373,855 filed Aug. 11, 2016, to U.S. Provisional Patent Application Ser. No. 62/362,440 filed Jul. 14, 2016, and to U.S. Provisional Patent Application Ser. No. 62/287,134 filed Jan. 26, 2016. U.S. patent application Ser. No. 14/883,299 is a continuation-in-part of U.S. patent application Ser. No. 14/298,634, filed Jun. 6, 2014, now issued as U.S. Pat. No. 9,198,678 on Dec. 1, 2015, and claims priority under 35 U.S.C. § 119(e) to U.S. Provisional Application Ser. No. 62/162,466, filed May 15, 2015. U.S. patent application Ser. No. 14/298,634 claims priority to U.S. Provisional Patent Application Nos. 61/877,837 filed Sep. 13, 2013, 61/845,463 filed Jul. 12, 2013, and 61/832,583 filed Jun. 7, 2013, and is a continuation-in-part of U.S. patent application Ser. No. 13/841,069 filed Mar. 15, 2013, now issued as U.S. Pat. No. 8,870,889, and claims the priority to U.S. Provisional Patent Application Nos. 61/625,559 filed Apr. 17, 2012, 61/393,695 filed Oct. 15, 2010, and 61/359,710 filed Jun. 29, 2010. U.S. patent application Ser. No. 13/841,069 is a also continuation in part of U.S. patent application Ser. No. 13/172,683 filed Jun. 29, 2011, now issued as U.S. Pat. No. 8,758,357. U.S. patent application Ser. No. 13/172,683 claims priority to U.S. Provisional Patent Application Nos. 61/393,695 filed Oct. 15, 2010, and 61/359,710 filed Jun. 29, 2010. U.S. patent application Ser. No. 15/997,404 also claims priority under 35 U.S.C. § 119(e) to U.S. Provisional Patent Application Ser. No. 62/628,626 filed Feb. 9, 2018. The entireties of these applications and patents are incorporated by reference herein.

FIELD OF THE INVENTION

The present disclosure generally relates to the field of medical devices, and more specifically toward systems for use with a patient-specific or patient-matched surgical device based on the patient's unique anatomical features for use in cervical and thoracic areas of the human spine. The present disclosure also relates to methods of manufacturing and using the same.

BACKGROUND OF THE INVENTION

Given the complexities of surgical procedures and the various tools, instruments, implants and other devices used in the procedures, as well as the varying anatomical differentiation between patients who receive those tools, instruments, implants and devices, it is often challenging to create a surgery plan that accounts for the unique and sometimes irregular anatomical features of a particular patient. For example, the implantation of orthopedic screws or other fixation devices in a patient's boney anatomy is well accepted amongst surgeons who treat various orthopedic pathologies. Although the performance of various screw constructs has become predictable, there are still multiple challenges with the placement and insertion of the orthopedic screws or other fixation devices. The challenges occur, for example, when a surgeon is unable to reference boney landmarks due to previous surgery or when the patient's anatomy is irregular in shape, or when a particular trajectory for insertion of the screws (or other fixation devices) is impeded by anatomical obstructions.

Surgeons now have the ability to readily convert magnetic resonance imaging (MRI) data or computed tomography (CT) data into a data set readable by computer-aided design (CAD) program and/or finite element modeling (FEM) program, which then may be used to create, for example, a customized surgical guide and/or implant based on the dynamic nature of the anatomical structures the customized guide/implant is designed to associate with. This data, while currently used by surgeons in surgery planning, is largely unused for creating a customized set of instruments or other surgical devices that are designed to complement the patient's unique anatomy.

In addition, virtual reality and/or augmented reality systems (collectively referred to as "AR" in this disclosure) have provided advantages to surgeons with respect to surgical planning and in particular the ability of surgeons to visual the orientation and placement of orthopedic implants and/or instruments. The surgeon would therefore benefit from the enhanced ability to merge AR capabilities with patient-specific surgical devices and/or equipment, as well as customized manufacturing and placement of patient-specific guides/implants. While various types of augmented reality (AR) systems are provided in the prior art, several are not applicable or usable with the current state of surgical equipment, including those AR systems that pertain to driving assistance for vehicles, games, and entertainment attractions. In addition, different localization methods may be used with prior art AR systems, such as sensor-based localization methods relying on the use of many sensors. As another example, certain AR systems rely on a global positioning system (GPS) sensor and/or an inertial measurement unit (IMU) sensor to verify a location and a direction of an object. When high accuracy is required, a sensor-based localization method requires a specific (and often expensive) sensor with a high degree of accuracy, but is not practical in surgical settings. Furthermore, many prior art vision-based localization methods rely on specific camera information to acquire highly precise information, yet are difficult to use in a surgical environment.

Specific surgical procedures are often performed in the spinal and/or cephalad region of a patient. The procedures performed in these areas are often designed to stop and/or eliminate all motion, including by removal and/or destruction of some or all of the boney anatomy in the patient's boney anatomy and/or implantable fixation devices (i.e., plates or screws) for limiting movement of the boney anatomy of the particular patient. By eliminating movement, pain and degenerative disease may be reduced or avoided.

A significant danger of performing operations on a patient's orthopedic anatomy, and in particular accessing an intervertebral space during a MIS surgery on the spine, is that of inadvertently contacting or damaging the para-spinal nerves, including the exiting nerve roots, traversing nerves and the nerves of the cauda equina. The exact location of these para-spinal nerves cannot be precisely determined prior to the commencement of surgery, and therefore are dependent on a surgeon's ability to visually locate the same after the initial incision is made. Moreover, intervertebral spaces in the spine have other sensitive nerves disposed at locations which are not entirely predictable prior to insertion of the surgical tool into the intervertebral area. Accordingly, the danger of pinching or damaging spinal nerves when accessing an intervertebral space has proven to be quite limiting to the methods and devices used during minimally invasive spinal surgery.

In addition, as cannula are received through the patient's back, such as when performing minimally invasive spinal surgery, minor blood vessels are ruptured, thereby blocking the surgeon's vision inside the intervertebral region after the cannula has been inserted. Other anatomical features at a particular patient may also obstruct the surgeon's view or make it difficult to provide illumination within the cannula. Therefore, one particular shortcoming that is addressed by the present disclosure is to provide devices which are patient-matched to facilitate proper location and orientation without use of microscopes or other equipment and that otherwise eliminate the problems associated with prior art procedures on the spine, including MIS procedures.

Virtual reality and/or augmented reality systems ("AR" for convenience) have provided advantages to surgeons with respect to surgical planning and in particular the ability of surgeons to visual the orientation and placement of orthopedic implants and/or instruments. The surgeon would therefore benefit from the enhanced ability to merge AR capabilities with patient-specific surgical devices and/or equipment, as well as customized manufacturing and placement of patient-specific guides/implants.

The use of patient-specific data sets may also assist a surgeon in selecting a desired location and/or trajectory for an implantable device so as to avoid sensitive anatomical features of a particular patient, or to secure an implantable device in a particular area for enhanced fusion between the patient's existing boney structures and the device. In other aspects, the data sets may facilitate placement of the device in an area of desired bone density. The use of patient-specific data sets also permit the surgeon to create a patient-contacting surface that is oriented to match one or more of the anatomical features represented by the data set, and thereby quickly and efficiently locate and place the patient-contacting surface(s) in the appropriate location and orientation.

Depending on surgeon and patient pathology, different surgical approaches may be used, including but not limited to Posterior Lumbar Interbody Fusion (PLIF), Transforaminal Lumbar Interbody Fusion (TLIF), Anterior Lumbar Interbody Fusion (ALIF) and Extreme Lateral Interbody Fusion (XLIF).

It would therefore be advantageous to provide a customized surgical plan based on the patient's unique characteristics and/or one or more medical devices that are adapted to conform to a plurality of anatomical features of a particular patient. It would also be advantageous to provide apparatus and methods to assist a surgeon in completing the surgical procedure(s) safely and efficiently. Finally, it is also advantageous to provide a procedure and/or apparatus that otherwise significantly reduces, if not eliminates, the problems and risks noted above. Other advantages over the prior art will become known upon review of the Summary and Detailed Description below.

In another aspect, use of patient-specific data sets may also assist a surgeon in selecting a desired trajectory for an implantable device so as to avoid sensitive anatomical features of a particular patient or to secure a bone anchoring device in a particular area of desired bone density during an actual procedure. The use of patient-specific data sets further permits the surgeon to avoid mistakes by creating customized tools and instruments, which may comprise orientation, end-stops or other safety related features to avoid over-torque and/or over-insertion of any implantable devices. The use of patient-specific data sets also permit the surgeon to create a patient-contacting surface that is oriented to match one or more of the anatomical features represented by the data set, and thereby quickly and efficiently locate and place the patient-contacting surface(s) in the appropriate location and orientation.

As described herein, the prior art fails to teach a system for creating patient-specific or patient-matched surgical apparatus, based on the data set derived from the MRI or CT scan, for use with robotic and AR systems. The use of the patient-specific data set for a vertebral or other anatomic body of a particular patient may allow a surgeon to accommodate for subtle variations in the position and orientation of a screw, plate or other bone anchor to avoid particular boney anatomy or irregularities in the positioning and alignment of the adjoining vertebral bodies.

It would therefore be advantageous to provide apparatus suitable for use with a surgical procedure and/or patient-specific apparatus that is adapted to conform to a plurality of anatomical features of a particular patient and that otherwise assists a surgeon in completing the surgical procedure(s) safely and efficiently. It is also advantageous to provide a procedure and/or apparatus that otherwise significantly reduces, if not eliminates, the problems and risks noted above.

SUMMARY OF THE INVENTION

According to one aspect of the present disclosure, a novel system and method is described for developing customized apparatus for use in one or more surgical procedures, particularly those procedures associated certain cervical and/or certain thoracic vertebrae. The systems and methods described herein incorporate a patient's unique morphology, which may be derived from capturing MRI, CT, or other data to derive one or more "Patient Matched" apparatus, which comprises complementary surfaces based on a plurality of data points from the MRI, CT or other anatomical data. Each "Patient Matched" apparatus is matched and oriented around the patient's own anatomy, and is preferably configured to incorporate specific and/or desired insertional trajectories (which may be verified in a pre-operative setting using 3D CAD software, such as the software disclosed in WO 2008027549, which is incorporated by reference herein in its entirety). According to one embodiment described herein, other apparatus used during the surgical procedure may facilitate the orientation and/or placement of one or more implants, including plates, screws, fixation devices, etc.

By way of providing additional background, context, and to further satisfy the written description requirements of 35 U.S.C. § 112, the following are incorporated by reference in their entireties for the express purpose of explaining and further describing the various tools and other apparatus commonly associated therewith surgical procedures, including minimally invasive surgery ("MIS") procedures: U.S. Pat. No. 6,309,395 to Smith et al.; U.S. Pat. No. 6,142,998 to Smith et al.; U.S. Pat. No. 7,014,640 to Kemppanien et al.; U.S. Pat. No. 7,406,775 to Funk, et al.; U.S. Pat. No. 7,387,643 to Michelson; U.S. Pat. No. 7,341,590 to Ferree; U.S. Pat. No. 7,288,093 to Michelson; U.S. Pat. No. 7,207,992 to Ritland; U.S. Pat. No. 7,077,864 Byrd III, et al.; U.S. Pat. No. 7,025,769 to Ferree; U.S. Pat. No. 6,719,795 to Cornwall, et al.; U.S. Pat. No. 6,364,880 to Michelson; U.S. Pat. No. 6,328,738 to Suddaby; U.S. Pat. No. 6,290,724 to Marino; U.S. Pat. No. 6,113,602 to Sand; U.S. Pat. No. 6,030,401 to Marino; U.S. Pat. No. 5,865,846 to Bryan, et al.; U.S. Pat. No. 5,569,246 to Ojima, et al.; U.S. Pat. No. 5,527,312 to Ray; and U.S. Pat. Appl. No. 2008/0255564 to Michelson.

The present disclosure relates to methods for pre-surgically planning at least one surgical procedure on a specific patient, including determining the optimal size of an interbody or other surgical device (L, W, H, and Angle) such that (a) the surgeon understands the optimal size to be implanted prior to surgery and (b) the range of choices required to satisfy the surgical operation are reduced. For instance, instead of carrying twenty (or more) different configurations of an interbody implant, the surgeon would be provided with a patient specific interbody device which is particularly design to the patient.

The method in creating such an interbody device is driven by a variety of factors, which include but are not limited to: patient data and information in the form of 2D or 3D images; converting said images into a file format which allows for three-dimensional viewing and manipulation; determining pre-surgical and post-surgical state of the patient's anatomy; and, designing the placement and contacts of a patient-specific device in the intervertebral disc space.

Accordingly, one aspect of the invention describes the discrete steps of a surgical planning method for achieving the objective described above. Further details regarding the method(s) are described below in relation to FIG. 1.

Another aspect of the present disclosure is to provide a method for preparing a customized surgical device or instrument, which in a preferred embodiment comprises, but is not limited to: (1) obtaining data associated with a patient's anatomy; (2) converting the data obtained to a 3-dimensional data set(s); (3) determining at least one trajectory or path for facilitating a surgical procedure to be performed on the patient; (4) determining at least one surface associated with the patient's anatomy; (5) generating a 3-dimensional representation of the customized surgical device or instrument, which incorporates the at least one trajectory of path and a matching surface to the at least one surface associated with the patient's anatomy; and (6) fabricating the customized surgical device or instrument using the 3-dimensional representation.

According to another aspect of the present disclosure, a system and method for facilitating a surgical procedure(s) comprises, but is not limited to: (1) Obtaining data associated with the patient's anatomy by way of a MRI or CT scan; (2) Converting the MRI or CT scan data to a 3-Dimensional data set(s); (3) Determining one or more axes or planes of orientation of a device to be constructed for use in facilitating the surgical procedure(s) to be performed on the patient; (4) Modeling the device for use in facilitating the surgical procedure(s) using the determined axes and accounting for any other constraints derived from the converted data set(s); (5) Generating a prototype of the modeled device by, for example, use of rapid prototyping machinery; and (6) Preparing the prototype for use during the surgical procedure(s).

According to this aspect described above, the method step of accounting for any other constraints derived from the converted data set(s) may comprise adjusting the size of the modeled device to accommodate the space limitations on the surgeon, orienting elements of the modeled device to avoid certain anatomical features, creating one or more surfaces that may conveniently be operatively associated with one or more instruments and/or tools used in the surgical procedure(s), etc.

According to yet another aspect of the present disclosure, the system and method includes use of data obtained from a radiographic imaging machine, a fluoroscopy, an ultrasonic machine or a nuclear medicine scanning device.

In another aspect, the patient-matching features may be confirmed by one or more additional process, such as fluoroscopy or other processes known to those of skill in the art.

In one aspect of the present disclosure, the method comprises the use of bone density data obtained through a CT scan of the patient anatomy for use in planning the trajectory of a surgical guide and corresponding fixation device or instrument, such as a cutting/routing/drilling instrument intended to penetrate the boney anatomy. This data may be used in other manners contemplated and described herein to assist the surgeon in planning, visualizing or otherwise preparing for the surgical procedure for the patient.

In yet another alternative embodiment, the data obtained from one of the scanning devices described above may be supplemented or merged with data from a bone density scanner to fabricate a device that is designed to remain in the patient after the surgical procedure is completed. It is to be expressly understood that data from a bone density scanner is not necessary to practice the inventions described herein, but may supplement the data and assist a surgeon or other medical professional in determining the proper location, trajectory, orientation or alignment of the various apparatus described herein.

According to yet another aspect of the present disclosure, data may be supplemented or merged with data from a bone density scanner to achieve further control over the orientation of any desired axes, particularly where the surgical procedure involves insertion of one or more implantable devices.

According to yet another embodiment, the data obtained from the patient permits the apparatus to be manufactured with defined pathways through the apparatus, which are operatively associated with at least one tool, instrument, or implant, and which permit the at least one tool, instrument or implant to be inserted in the defined pathways in a consistent and reproducible manner. Examples of devices that are implanted or remain in the patient include anchoring devices such as screws, pins, clips, hooks, etc., and implantable devices such as spacers, replacement joints, replacement systems, cages, etc.

In one embodiment, the surgical device is manufactured by a process selected from the group consisting of a rapid prototyping machine, a stereolithography (SLA) machine, a selective laser sintering (SLS) machine, a selective heat sintering (SHM) machine, a fused deposition modeling (FDM) machine, a direct metal laser sintering (DMLS) machine, a powder bed printing (PP) machine, a digital light processing (DLP) machine, an inkjet photo resin machine, and an electron beam melting (EBM) machine. Optionally, the surgical device may be made of an aluminum alloy, a chromium alloy, a PEEK material, a carbon fiber, an ABS plastic, a polyurethane, a resin, a fiber-encased resinous material, a rubber, a latex, a synthetic rubber, a polymer, and a natural material. In one embodiment, the surgical device comprises one or more of a polymeric material and a metallic material.

According to yet another embodiment, patient-specific data permits the apparatus to be manufactured with defined lattices and/or apertures in the body of the implant as depicted in Appendix A. Example implantable devices include but are not limited to spacers, replacement joints, replacement systems, cages, etc.

In embodiments, patient-matched devices may comprise a surgical guide that is oriented in at least one trajectory. The surgical guide may be used with one or more patient-matched instruments for achieving, by way of example, a TLIF trajectory or approach to the patient's vertebrae. In other embodiments, the trajectory may be one of: (1) a cervical pedicle screw trajectory; (2) a pedicle screw trajectory; (3) a cortical or cortical bone trajectory; (4) a sacral pedicle trajectory; (5) a sacral alar trajectory; (6) an S2-alar-iliac trajectory; (7) an iliac trajectory; (8) a transarticular trajectory; (9) a lateral mass trajectory; (10) a translaminar trajectory; (11) a transcondylar trajectory; and (12) an occipital trajectory (for example, during an operation on a patient's occipital or surrounding cervical anatomy).

In embodiments, one or more patient-specific or patient-matched devices, as described herein, may be used with various orientation or registration markers for identification by a robot. Certain guides may comprise an embedded chip, circuit or equivalent with presurgical planning information, which may be read by a machine and deliver specific instructions to a robotic surgical device, for example. Such patient-specific guides may be used on multiple levels of a patient's spine that are impacted by a particular surgical procedure, and thereby provide markers for registration and orientation without having to rescan the patient throughout the surgery. The robotic device may view the patient and position of the patient's unique anatomy through the identification of the markers, and thereby more rapidly align instrumentation controlled by the robotic equipment.

In embodiments, the patient-matched devices described herein may comprise a locating feature for a robot or other autonomous device to align the guide to a vertebra in space, for example. With multiple locating guides placed on a patient's vertebra, a robot can drill into the vertebra, affix an orientation tool, and/or orient vertebra relative to each other to meet pre-surgically planned spinal alignment. Pre-surgically planned spinal alignment may also be matched to one or more pre-bent rods, minimizing surgical time. In other embodiments, the robot or other autonomous device may be configured to perform an osteotomy with known locations of vertebra relative to each other.

Thus, in embodiments, the devices described herein may be used with an AR system or associated simulation device. In one embodiment, the AR capabilities are provided in conjunction with a physical guide, while in other embodiments the capabilities are provided in conjunction with a "virtual" guide. In one embodiment, the surgical device is configured as a patient-specific pedicle screw placement guide is for use with a surgical instrument or implantable device. The pedicle screw placement guide is preferably adapted to guide intra-operative placement of pedicle screws that are used to anchor a pedicle screw spinal system onto target portion of a patient's anatomy. In one embodiment, the target portion of the patient's anatomy is a posterior element of the patient's spine, including lumbar, thoracic, and cervical portions of a patient's spine.

In addition to the aspects described above, various surgical procedures using the apparatus and systems described herein may be performed with sequential or simultaneous introduction of rods, pins, plates, screws or other surgical devices into adjacent boney anatomy to join various portions of, for example, cervical vertebrae of a particular patient. Such procedures often require introduction of additional tools to prepare a site for implantation. These tools may include drills, drill guides, debridement tools, irrigation devices, vises, clamps, cannula, and other insertion/retraction tools.

Orthopedic and other surgeries may be performed by a number of different procedures, as opposed to conventional surgical procedures and methods, which typically require cutting of muscles, removal of bone, and retraction of other natural elements. During a MIS procedure, for example, including procedures using the apparatus of the present invention, a less destructive approach to the patient anatomy is carried out by using retractor tubes or portals, which take advantage of anatomy and current technology to limit the damage to intervening structures.

In typical surgical procedures, skeletal landmarks are established fluoroscopically and a small incision is made over the landmark(s). According to various methods known in the prior art, a series of dilators may be applied until one or more cannula is placed over the anatomic structure. In some procedures, a microscope is then placed over the operative site to provide illumination and magnification with a three-dimensional view of the anatomical site to ensure that the surgeon is able to accurately locate the desired patient anatomy and properly position and orient any tool, instrument or other surgical device used during the procedure. The microscope, however, is an expensive and unwieldy device requiring uncomfortable gyrations of the surgeon's back and neck in order to gain the necessary view and is a nuisance to drape (a large, sterile plastic bag has to be placed over the eight-foot-tall structure). The use of adequate illumination is also difficult to direct due to the size of the microscope.

The customized and integrated matching aspects of this presently disclosed system provides an advantage over the prior art, in particular by providing a plurality of interlocking and/or matching points for each apparatus, which are easily or efficiently registerable and positionable using robotic and AR systems, which in turn reduces the likelihood of misalignment, misplacement and subsequent mistake during the surgical procedure(s).

Accordingly, one aspect of the present disclosure is to provide a method for preparing a customized surgical device or instrument, which in a preferred embodiment comprises, but is not limited to: (1) obtaining data associated with a patient's anatomy; (2) converting the data obtained to a 3-dimensional data set(s); (3) determining at least one trajectory or path for facilitating a surgical procedure to be performed on the patient; (4) determining at least one surface associated with the patient's anatomy; (5) generating a 3-dimensional representation of the customized surgical device or instrument, which incorporates the at least one trajectory of path and a matching surface to the at least one surface associated with the patient's anatomy; (6) fabricating the customized surgical device or instrument using the 3-dimensional representation; (7) registering at least one marker on the customized surgical device with a robotic or an AR system; and (8) positioning the customized surgical device on the patient's anatomy utilizing the at least one surface associated with the patient's anatomy and the at least one marker.

According to embodiments, the at least one trajectory or path may be a pedicle screw trajectory, a cortical bone trajectory, a cortical trajectory, a sacral pedicle trajectory, a sacral alar trajectory, an S2-alar-iliac trajectory, an iliac trajectory, a transarticular trajectory, a lateral mass trajectory, a translaminar trajectory, a transcondylar trajectory, a cervical pedicle screw trajectory, a sub axial lateral mass screw trajectory, a transpedicular screw trajectory, a pars screw trajectory, an occipitocervical screw trajectory, an occipital screw trajectory and an occipital condyle C1 screw trajectory.

According to this aspect described above, the method steps may further comprise adjusting the size of the modeled device to accommodate the space limitations on the surgeon, orienting elements of the modeled device to avoid certain anatomical features, creating one or more surfaces that may conveniently be operatively associated with one or more instruments and/or tools used in the surgical procedure(s), etc.

According to yet another aspect of the present disclosure, the system and method includes use of data obtained from a radiographic imaging machine, an ultrasonic machine, a bone density scanning machine, or a nuclear medicine scanning device.

In another aspect, the patient-matching features may be confirmed by one or more additional process, such as fluoroscopy or other processes known to those of skill in the art.

In one aspect of the present disclosure, the method comprises the use of bone density data obtained through a CT scan of the patient anatomy for use in planning the trajectory of a surgical guide and corresponding fixation device or instrument, such as a cutting/routing/drilling instrument intended to penetrate the boney anatomy. This data may be used in other manners contemplated and described herein to assist the surgeon in planning, visualizing or otherwise preparing for the surgical procedure for the patient.

In yet another alternative embodiment, the data obtained from one of the scanning devices described above may be supplemented or merged with data from a bone density scanner to fabricate a device that is designed to remain in the patient after the surgical procedure is completed. It is to be expressly understood that data from a bone density scanner is not necessary to practice the inventions described herein, but may supplement the data and assist a surgeon or other medical professional in determining the proper location, trajectory, orientation or alignment of the various apparatus described herein.

According to yet another aspect of the present disclosure, data may be supplemented or merged with data from a bone density scanner to achieve further control over the orientation of any desired axes, particularly where the surgical procedure involves insertion of one or more implantable devices.

In embodiments, devices described herein may be used with various orientation or registration markers for identification by a robot. Certain guides may comprise an embedded chip, circuit or equivalent with presurgical planning information, which may be read by a machine and deliver specific instructions to a robotic surgical device, for example. Such patient-specific guides may be used on multiple levels of a patient's spine that are impacted by a particular surgical procedure, and thereby provide markers for registration and orientation without having to rescan the patient throughout the surgery. The robotic device may view the patient and position of the patient's unique anatomy through the identification of the markers, and thereby more rapidly align instrumentation controlled by the robotic equipment.

In embodiments, the devices described herein comprises a locating feature for a robot or other autonomous device to align the guide to a vertebra in space, for example. With multiple locating devices placed on a patient's vertebra, a robot can drill into the vertebra, affix an orientation tool, and/or orient vertebra relative to each other to meet pre-surgically planned spinal alignment. Pre-surgically planned spinal alignment may also be matched to one or more pre-bent rods, minimizing surgical time. In other embodiments, the robot or other autonomous device may be configured to perform an osteotomy with known locations of vertebra relative to each other.

In embodiments, the surgical devices described herein may be used with an AR system or associated simulation device. In one embodiment, the AR capabilities are provided in conjunction with a physical guide, while in other embodiments the capabilities are provided in conjunction with a "virtual" guide. In one embodiment, the surgical device is configured as a patient-specific pedicle screw placement guide is for use with a surgical instrument or implantable device. The pedicle screw placement guide is preferably adapted to guide intra-operative placement of pedicle screws that are used to anchor a pedicle screw spinal system onto target portion of a patient's anatomy. In one embodiment, the target portion of the patient's anatomy is a posterior element of the patient's spine, including lumbar, interbody and cervical portions of a patient's spine.

Another aspect of the present disclosure relates to a system for performing one or more surgical procedures facilitated by a computer-aided navigational apparatus, comprising: at least one robotic apparatus; a processor in communication with the at least one robotic apparatus; a patient-specific apparatus configured to be placed on at least one patient-specific feature; at least one marker that is positioned in a known location relative to patient anatomy and configured to transmit positional information to the processor; wherein the processor is configured to receive and relay the positional information received from the at least one marker to determine the location and orientation of the at least one robotic apparatus relative to patient anatomy.

In another embodiment, the device(s) utilizes anatomic landmarks that are identified pre-operatively by a medical imaging scan of the patient, as well as markers that are registerable using a robotic or AR system. Optionally, the medical imaging scan of the patient may include one or more of: an MRI scan, a CT scan, and an x-ray scan. Data obtained from the medical imaging scan may be used to generate a pre-operative plan for the patient and facilitate the operation for the specific patient. The device may therefore be configured to be used in a surgical procedure to place a pedicle screw in a pre-operatively determined orientation or trajectory.

According to yet another aspect of the present disclosure, a method for creating a template for use in a surgical operation is disclosed. The method includes, but is not limited to: (1) collecting data from the patient corresponding to the patient's unique anatomy; (2) creating a model of the template from the data collected, the model comprising a plurality of matching surfaces to the patient's unique anatomy; (3) providing data associated with model to fabrication machinery; (4) rapidly generating the template to comprise the plurality of matching surfaces and further comprising at least one additional matching surface corresponding to at least one tool or instrument used in the surgical operation; and (5) generating a permanent device based on the template for use in the surgical operation.

In one embodiment of the present disclosure, the model is a digital model. In another embodiment of the present disclosure, the model is a physical model.

The surgical device may be used in one or more of a minimally invasive surgical procedure and a minimal access procedure. In one embodiment, the surgical device is configured for use in conjunction with a device that employs automated or semi-automated manipulation such that placement of the surgical device with respect to the anatomical feature may be performed remotely by an operator through a computer controller. In another embodiment, the surgical device is identifiable by optical, electronic, or radiological recognition means such that the location and orientation of the surgical device with respect to the anatomical feature is verifiable. In still another embodiment, the surgical device is configured for use in conjunction with a navigation device such that placement of the surgical device with respect to the anatomical feature assists with one or more of registration, stability, and motion tracking by the navigation device.

Incorporated by reference in their entireties are the following U.S. patents and patent applications and international publications directed generally to methods and apparatus related to surgical procedures, thus providing written description support for various aspects of the present disclosure. The U.S. patents and pending applications incorporated by reference are as follows: U.S. Pat. Nos. 9,295,497, 8,758,357, 8,419,740, 8,357,111, 8,298,237, 8,277,461, 8,257,083, 8,214,014, 8,206,396, 8,167,884, 8,159,753, 7,957,824, 7,844,356, 7,658,610, 7,623,902, 7,491,180, 7,235,076, 6,755,839, 6,711,432, 5,201,734, and 3,151,392, U.S. Design Pat. Nos. D705,929, D669,176, D672,038, D618,796, D606,195, D533,664, D532,515, D428,989, D420,132, D412,032, D403,066, and D359,557, and U.S. Pat. Pub. Nos. 2013/0123850, 2013/0053854, 2013/0218163, 2012/0215315, 2012/0179259, 2012/0130434, 2012/0041445, 2011/0319745, 2011/0288433, 2011/0224674, 2011/0218545, 2011/0213376, 2011/0190899, 2011/0184526, 2011/0184419, 2011/0166578, 2011/0160867, 2011/0160736, 2011/0093086, 2011/0093023, 2011/0071533, 2011/0054478, 2011/0046735, 2011/0015639, 2011/0015636, 2010/0324692, 2010/0305700, 2010/0217336, 2010/0217270, 2010/0191244, 2010/0152782, 2010/0100193, 2010/0087829, 2010/0082035, 2010/0049195, 2010/0016984, 2009/0270868, 2009/0254093, 2009/0198277, 2009/0187194, 2009/0138020, 2009/0110498, 2009/0099567, 2009/0093816, 2009/0088763, 2009/0088761, 2009/0088674, 2009/0087276, 2008/0319491, 2008/0312659, 2008/0275452, 2008/0257363, 2008/0183214, 2008/0161815, 2008/0114370, 2007/0288030, 2006/039266, 2006/0241385, 2006/0149375, 2006/0095044, 2006/0084986, 2005/0148843, 2004/0243481, and 2004/0097925. The international publications incorporated by reference are as follows: European Publication No. EP 2168507, and World Intellectual Property Organization Pub. Nos. WO 2013/104682, WO 2013/041618, WO 2012/152900, WO 2011/109260, WO 2011/106711, WO 2011/080260, WO 2011/041398, WO 2010/148103, WO 2010/033431, WO 2009/129063, WO 2008/027549, and WO 2007/145937, and Chinese Publication Nos. CN 201275138, CN 201404283, CN 101390773, and CN 101953713.

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the claims set forth herein below define the invention.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures. It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein. In the drawings.

DETAILED DESCRIPTION

As shown in FIGS. 1-4 and described in further detail herein, the present disclosure relates to a novel system and method for design and use of a customized, patient-matched apparatus for use in a diverse number of surgical procedures, particularly those procedures occurring in the cervical and thoracic spine. The apparatus preferably uses a patient's unique morphology, which may be derived from capturing MRI data, CT data, or any other medical imaging device to derive one or more patient-matched elements or components, which comprise complementary surfaces to those encountered during the surgical procedure(s) as derived from a set of data points.

According to various embodiments described herein, the patient-matched apparatus may comprise one or more cannula(e), one or more arms, a tab for grasping the apparatus, and one or more patient-matched surfaces for seating the apparatus on a particular patient's anatomical features. The apparatus may further comprise desired axes and/or insertional trajectories. According to embodiments, the patient-matched apparatus may be further matched with at least one other apparatus used during the surgical procedure. Other features of the disclosure will become apparent after a review of the following disclosures and varying embodiments of the disclosure.

Figure 1:
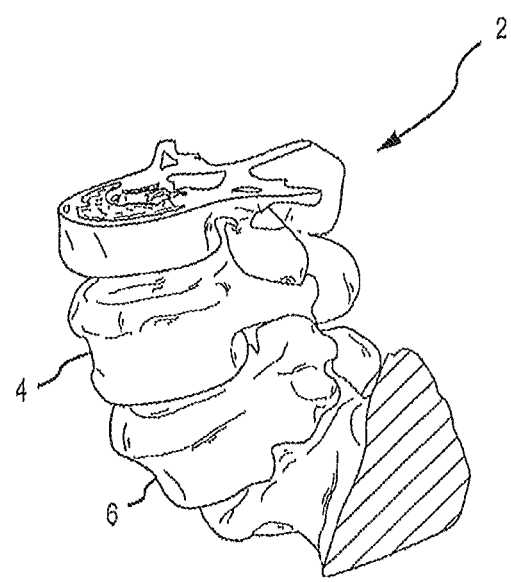
FIG. 1 is a perspective view of a three-dimensional model of a unique grouping of anatomical features from which a set of data points may be derived.

A patient-specific device or apparatus may be formed utilizing the methods disclosed herein. In embodiments, the apparatus may be referred to as a "guide" and is adapted to fit directly to aspects of a patient's anatomy. Referring now to FIG. 1, a perspective view of a three-dimensional model of a unique grouping of anatomical features according to one embodiment of the present disclosure is shown. Here, the model 2 is comprised of multiple vertebral bodies 4, 6 but according to other embodiments may be comprised of any anatomical grouping for a particular patient. Data associated with the model 2 may be captured from a MRI or CT scan or from radiographic images of the patient's corresponding boney anatomy (or alternatively from other data sources). The data, once captured, may be converted using known software tools to a CAD program, where the data set is representative of the model 2 and may be used to provide additional data points for forming the contours, sizes, shapes and orientations of one or more apparatus to be used in the surgical procedure.

According to an alternative embodiment, the data may be obtained from an ultrasonic or nuclear medicine scanning device. In yet another alternative embodiment, the data may be supplemented or merged with data from a bone density scanner to fabricate a device that is designed to remain in the patient after the surgical procedure is completed, or alternatively to achieve further control over the orientation of any desired axes, particularly where the surgical procedure involves insertion of one or more implantable devices.

Figure 2:
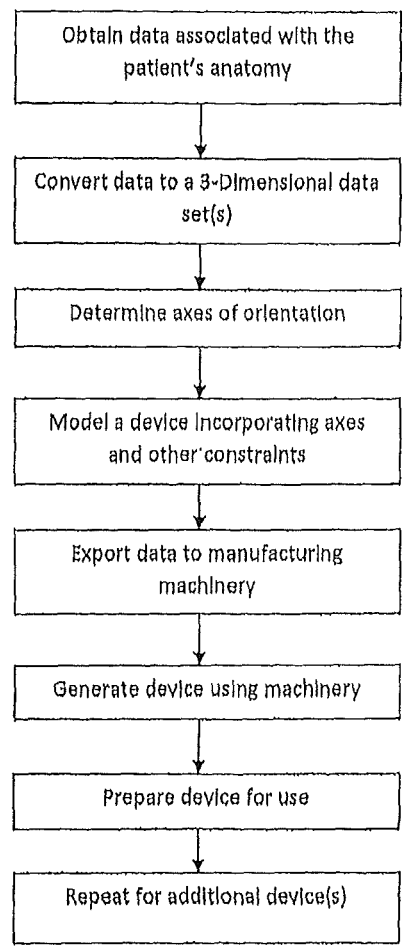
FIG. 2 is a flow chart diagram showing the various steps of performing a method of manufacturing and using a device according to one embodiment of the present disclosure.

FIG. 2 is a flow chart showing the various steps of performing a method of manufacturing an apparatus, according to various embodiments described herein, for use in facilitating a surgical procedure. The method, according to a preferred embodiment, comprises the following steps: A) Obtaining data associated with the patient's anatomy by way of a MRI or CT scan; B) Converting the MRI or CT scan data to a 3-Dimensional data set(s); C) Determining one or more axes of orientation of a device to be constructed for use in facilitating the surgical procedure(s) to be performed on the patient; D) Modeling the device for use in facilitating the surgical procedure(s) using the determined axes and accounting for any other constraints derived from the converted data set(s); E) Generating a prototype of the modeled device by, for example, use of rapid prototyping machinery; and F) Preparing the prototype for use during the surgical procedure(s).

As shown in FIG. 2, the method may comprise additional steps or may be repeated for additional devices used in the surgical procedure. The step of obtaining data is typically performed in a traditional manner, by subjecting the patient to a scan using MRI or CT or other suitable scanning equipment known in the art. The data is then captured by the equipment and may be converted to a 3-Dimensional data set(s) by software or other algorithmic means known in the art, such as by exporting the data into a known modeling software program that allows data to be represented, for example, in CAD format. Once this data is converted, a device may be modeled to complement the data set(s) and oriented by one or more axes determined by the surgeon either before or through observation of the data set(s) from the initial scan of the patient's anatomy.

The method step of accounting for any other constraints derived from the converted data set(s) may comprise adjusting the size of the modeled device to accommodate the space limitations on the surgeon, orienting elements of the modeled device to avoid certain anatomical features, creating one or more surfaces that may conveniently be operatively associated with one or more instruments and/or tools used in the surgical procedure(s), etc. The prototype may be generated using known rapid prototyping machinery, or alternatively by milling machinery such as a CNC milling machine. Alternatively, the initial device fabricated by this method may be in a temporary state for further consideration and or manipulation by the surgeon, and then finally constructed using one of the methodologies described herein. The steps may be repeated for complementary devices, some or all of which may include further matching surfaces for the patient's anatomy or to the previously fabricated devices (i.e., the devices fabricated may have matching surfaces for adjoining together one or more devices, as described in greater detail below).

Figure 3:
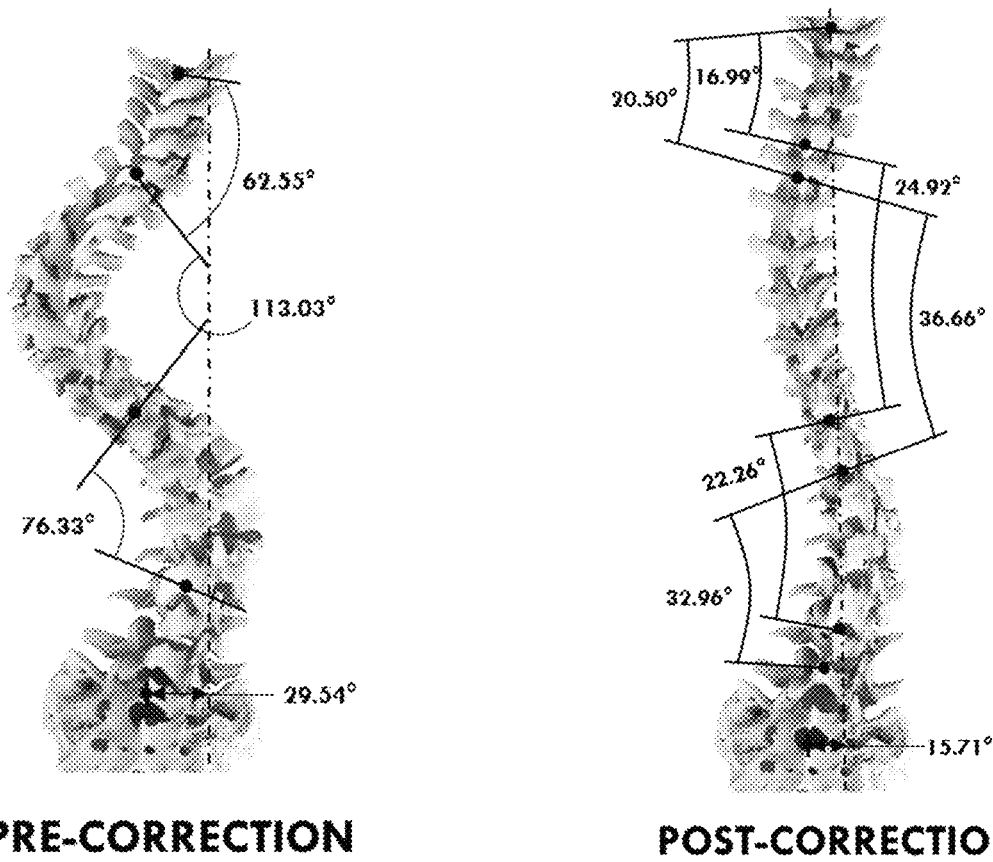
FIG. 3 includes elevation views of a unique grouping of anatomical features in a pre-operation and post-operation configuration according to one embodiment of the present disclosure.

Referring to FIG. 3, the system and method described herein may facilitate the alignment of various anatomical features for a particular patient, such as, for example, multiple vertebral bodies in a patient to correct spinal deformities. For example, the data set(s) may provide an initial location for the anatomical features, but may be further manipulated by the surgeon in a pre-operative setting to create a desired data set(s), such as a final location for the anatomical features once the surgical procedure(s) are completed (i.e., post-operation). Further detail is provided below in describing the method steps shown in FIG. 4.

The devices formed by the system and method described above may be used in either an initial location or a final location for the anatomical features, and be matched to those specific locations and orientations for each stage of the surgical procedure. These staged devices may in turn provide the surgeon with a visual guide to determine the degree of correction achieved through the surgical procedure, as compared to the pre-operative plan. Other variations on the method of the present disclosure are described in the Summary and included in the appended claims.

Figure 4:
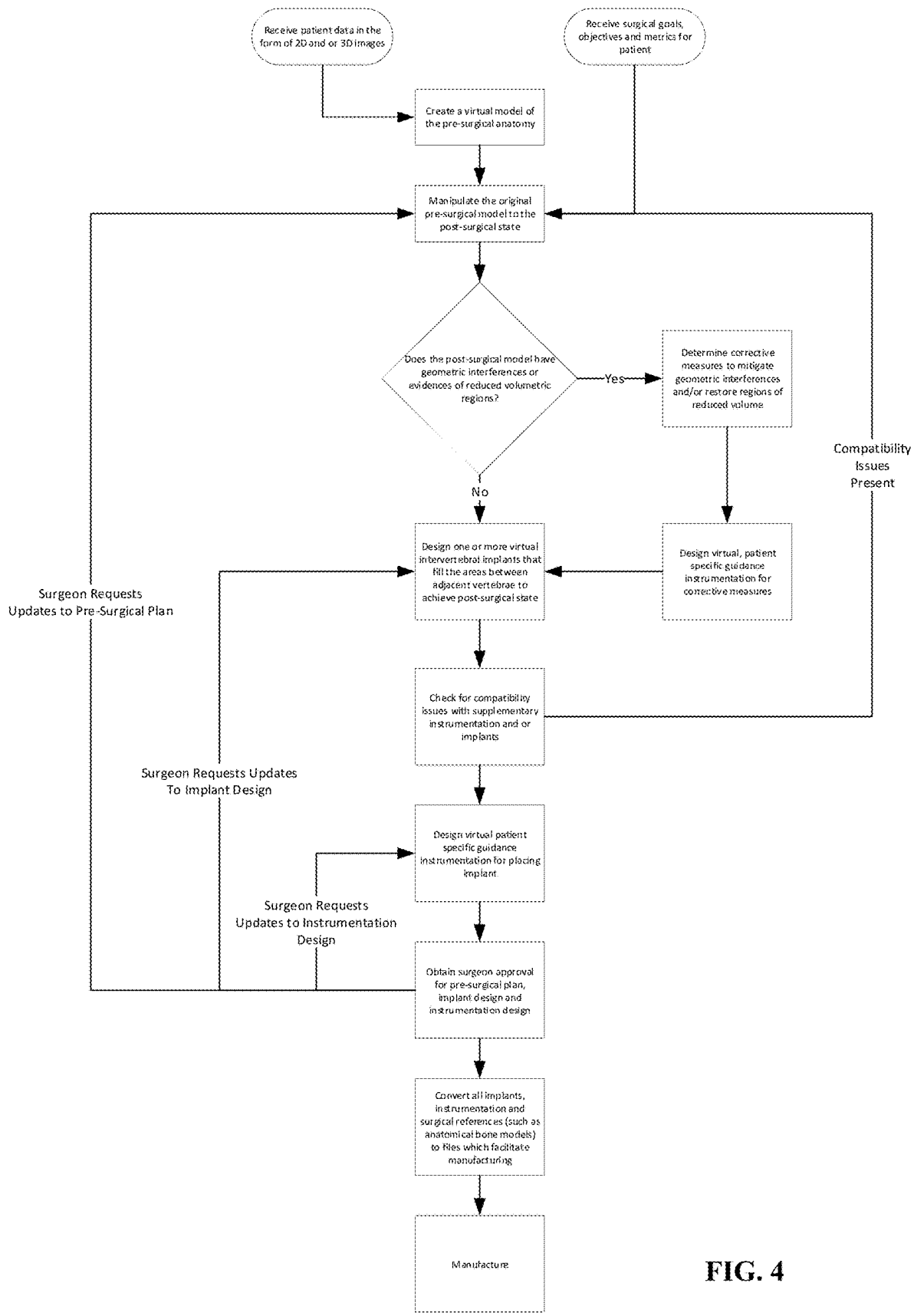
FIG. 4 is another flow-chart diagram showing various steps of performing a method of presurgical planning according to another embodiment of the present disclosure.

Referring now to FIG. 4, several steps of a method according to one embodiment of the present disclosure are illustrated. Initially, the method may comprise receiving patient data. The patient data may be 2D or 3D imaging data, or may be other types of patient data as described below. After receiving the patient data, the method preferably comprises the step of creating a model of the pre-surgical anatomy, its position, arrangement and interrelationship. In embodiments, the model is a virtual model. Once the pre-surgical model is created, a user may manipulate the pre-surgical for, by way of example, considering potential or desired post-surgical positioning and alignment.

The comparison of the pre-surgical model and post-surgical position permits further steps to be implemented. For example, the method may comprise the step of comparing pre- and post-surgical models for areas or points of geometric interference. Alternatively, the comparison may yield areas or regions of reduced volume. If either of the foregoing comparisons are affirmative, the next step may be to determine corrective measures in order to mitigate interferences, or alternatively to reduce regions of reduced volume. Then, the method may comprise the step of designing virtual, patient-specific instrumentation and guidance to achieve the corrective measures determined in the preceding step.

Once all interferences or regions of reduced volume are addressed, the method may comprise designing one or more virtual implants for obtaining the post-surgical alignment and positioning desired. At this stage, the method may also comprise checking for compatibility between supplemental instrumentation and implants designed in the preceding step. If true, and compatibility issues are presented, the method may return to the manipulation step wherein the post-surgical model is further manipulated to address the issue(s). If no issues are present, the method may comprise the step of designing virtual patient specific guidance and/or instrumentation for placing an implant. Once all implants, guidance and instrumentation have been designed and validated, the method may comprise obtaining surgeon or regulatory approval. Once the pre- and post-surgical plans are approved, the implants, guidance and instrumentation may advance to fabrication.

At the approval stage, any updates requested by the surgeon may be incorporated. This, in turn, may require repeating the step of designing virtual patient specific guidance or instrumentation to account for the updates in the surgical plan. In some instances, the surgeon or other approver may request updates to the pre-surgical plan, which then returns to the step of manipulating the pre- and post-surgical plans accordingly. If not, however, the method continues with the step of converting all implants, guidance and instrumentation to appropriate file types for manufacturing. In one embodiment, this step may comprise additive manufacturing. The final step is to manufacture and provide the implants, guidance and instrumentation to the site where the surgery is to be performed.

In a preferred embodiment, the following axes, planes or anatomical points of interest include: a sagittal plane; a coronal plane; an axial plane; a top vertebral body endplate plane; and a bottom vertebral body endplate plane. In other embodiments, one or more additional planes/points include: a vertebral body midpoint; a center of mass; a posterior/superior vertebral body point; a posterior/inferior vertebral body point; an anterior/superior vertebral body point; an anterior/inferior vertebral body point; a right lateral/superior vertebral body point; a left lateral/superior vertebral body point; a right lateral/inferior vertebral body point; a left lateral/inferior vertebral body point; a global spine sagittal plane; a global spine coronal plane; and a global spine axial plane.

The method may comprise one or more steps for preparing a pre-operative model, such as a virtual model, of the unique anatomical grouping. The method may specifically comprise: calibrating an x-ray image to a CT image to determine the scale of the x-ray image. In this manner, the method may use one or more reference points on the segmented vertebrae or the CT image itself that may be easily identified on the x-ray. The method may further involve calibrating the x-ray by adding a scale to the image(s).

The method may further comprise the step of segmenting vertebra outside of the surgically instrumented region of interest, such as via the x-ray image(s). This step may only be required on specific vertebral bodies, including those requiring segmentation using an elliptical cylinder-type shape, while other anatomical bodies may be segmented from x-ray images, including the spinous process, transverse process, etc. Femoral heads may be segmented in the x-ray image(s) using a sphere, while the sacrum may be segmented using a curved cone-type shape.

Next, the method may involve combining the segmented CT imaged vertebrae with the segmented x-ray imaged vertebrae, and arranging those vertebrae in a weight-bearing alignment. Under this step, the method may register CT-based segmentation to x-ray image(s) by aligning the outline of the arranged 3D model (taken from the CT scan) to the boney outline in the x-ray image(s). The registration may be dependent on the patient's positioning, as the patient may be standing, sitting, or lying down. Next, the method may align segmented CT vertebrae to anterior/posterior and/or lateral calibrated weight bearing arrangement.

Referring again to FIG. 3, the method may comprise the step of measuring and/or determining pre-operative parameters, for example, by using a pre-operative virtual model based off of planes and reference points created on the segmented vertebrae from the CT image(s). These reference points may comprise at least one of: lumbar lordosis; pelvic incidence; pelvic tilt; sacral slope; thoracic kyphosis; sagittal vertical axis (SVA); coronal balance; pelvic obliquity; interbody height; interbody coronal angle; interbody sagittal angle; and Cobb angle. Then, a user may be provided with a pre-operative virtual model for review, including for diagnostic purposes and to determine surgical plan.

The method may also involve the step of creating a surgical plan. Initially, the method may entail receiving surgeon input on a specific surgical operation, such as the surgical procedure(s) and surgical goals. Surgeon input may be based on pre-operative surgical model or may be provided prior to creation of a pre-operative surgical model. Surgeon input may also include planned interbodies, planned instrumented levels, planned osteotomies, planned final spinopelvic parameters, decompression goals, or other surgical plans.

Another step may entail modifying the pre-operative virtual model based on surgeon input of a planned surgical procedure. Then, the method may entail creating an operative plan virtual model representative of the patient's planned anatomical configuration following the surgical procedure. Another step may include adjustment of the model, which in turn may include vertebral (one or more) translation in any plane or in 3D. Adjustment of the model may further include vertebral (one or more) rotation about any plane or point, execution of planned osteotomies on the segmented bones of the virtual model, or a planned interbody device being inserted between two vertebral levels. Interbody devices and/or implants may be stock or patient-specific. Adjustment of model may include VCR and implant insertion. Preferably, anatomical measurement will automatically update while modification of the virtual model is occurring as described in greater detail below.

Next, the method may include the step of analyzing the operative plan virtual model for acceptability. Then the method may include reviewing for nerve impingement in foramen and spinal canal, over-stretching/compression of vertebral interbody space, mathematical parameter or based off of bending x-rays, planned spinopelvic parameter acceptability, or bone-on-bone contact.

If the operative plan virtual model is not acceptable, another step may be to update the operative plan virtual model within the bounds of the surgeon input. The surgical plan may be updated to add osteotomies for impingement or bone-on-bone contact or for planned spinopelvic parameters. If operative plan virtual model cannot be updated to acceptability within the bounds of the surgeon input, another step may be to suggest alternative surgical plans to the surgeon or get additional surgeon input.

Once an acceptable virtual plan has been created, the next step is to add patient-specific and/or stock implants to the operative plan virtual model, as applicable. Implants may include, but not limited to rods, pedicle screws or other fixation devices, patient-specific interbody devices, stock interbody devices, patient-specific rods, crosslinks, or other devices. This step may also include creating guides and/or instrumentation specific to the operative plan virtual model.

Next, the system may create a surgical plan and provide it to the surgeon for approval. The surgical plan preferably includes visualization of the operative plan virtual model in 3D by the surgeon, pre-operative and/or planned post-operative spinopelvic parameters and other measurements, planned boney modification procedures and planned implants, among other things.

If the plan is not acceptable to the surgeon, update the operative plan surgical model and present to the surgeon until an acceptable plan is achieved.

It is expressly understood that the foregoing steps may be either automatic, manual or automatic with manual adjustments. In addition, although CT imaging data is referred to throughout this disclosure, MRI, CTA, or other 3D imaging may be used in lieu of CT scans.

In embodiments, soft tissue (i.e., ligament, muscle, neuro, vascular, or intervertebral disc material) analysis may be included in the pre-operative and planned analysis. Additionally or alternatively, soft tissue may be included in the virtual model described above. In other embodiments, bone density analysis may be included with the pre-surgical virtual model and/or operative plan virtual model. The bone density analyzed may be global or regional, or specific to one vertebra or one region.

In the embodiments incorporating AR, a machine learning (ML) program/algorithm may be provided. In embodiments, the ML is configured to suggest surgical procedure, correction, and/or surgical region of interest based on the pre-operative imaging and virtual model of the spine. The ML may access one or more databases of past cases to identify patients with similar pre-surgical pathologies, wherein the ML is configured to predict achievable outcome based on outcomes of similar patients identified in the one or more databases.

In embodiments, a user may implement the methods described herein to plan surgical correction based on an achievable outcome, such as the outcome determined by ML. Alternatively, the method may incorporate patient health scores from post-surgical data to filter out identified patients to only positive outcomes.

In certain embodiments, the method may utilize a database of gait analysis to identify similar patients to help identify surgical procedure, correction, & surgical region of interest. The ML algorithm may be configured to auto-correct the spine based off of user input of planned surgical procedure(s).

In other embodiments, ML provides proposed fixation element trajectories, patient-specific implants, or off the shelf implants. The ML algorithm may predict compensatory correction of curves outside of the instrumented construct, based on a database of post-op images. A ML algorithm may also be configured to predict implant material, diameter, shape, size, and/or mechanical properties based at least in part off of at least one of the following; bone density, patient demographics, patient pathology, planned correction, or soft tissue analysis.

The method may comprise the step of export and storing (in the one or more databases) pertinent patient demographics, pathology, anatomical landmarks, etc.

A software program may be provided to enable the end user (surgeon) can view the 3D surgical plan model, spinopelvic parameters, and planned procedures and accept/reject the surgical plan via a user interface for the end user. The surgical plan may be automatically updated based on surgeon feedback, and in turn a new surgical plan may be generated for further approval. Although embodiments described above relate to interbody, surgical planning may be expanded into the cervical spine and applicable implants. Regardless, the method may further comprise manufacturing one or more implants based on the surgical plan.

Fabrication methods are also included in this disclosure, and may comprise the use of a rapid prototyping machine, such as a stereolithography (STL) machine, selective laser sintering (SLS) machine, or a fused deposition modeling (FDM) machine, direct metal laser sintering (DMLS), electron beam melting (EBM) machine, or other additive manufacturing machine. One example of such a rapid prototyping machine is commercially available from 3D Systems and known as Model SLA-250/50. The rapid prototyping machine selectively hardens a liquid, powdered or other non-hardened resin or metal into a three-dimensional structure, which can be separated from the remaining non-hardened resin, washed/sterilized and used directly as the apparatus. The prototyping machine receives the individual digital data sets and produces one structure corresponding to each of the desired apparatus.

Generally, because stereolithographic machinery produces a resin, which may have less than optimal mechanical properties (which may not be generally acceptable for a particular surgical use), the prototyping machine may alternatively be used to produce a mold. After the model is prepared, a conventional pressure or vacuum molding machine may be used to produce the apparatus from a more suitable material, such as stainless steel, titanium alloy, aluminum alloy, chromium alloy, PEEK, carbon fiber, or other metals or metal alloys.

According to another alternative embodiment, the system and method may comprise providing the data set(s) to a CNC machine, which in turn may be utilized to manufacture a custom milled apparatus from one of the more mechanically sound materials listed above. In yet another alternative embodiment, volume manufacturing of apparatus in accordance with the embodiments described herein may also be achieved, for example, where a particular orientation or insertion trajectory is common among a large grouping of patients.

According to one particular embodiment of the present disclosure, a system and method is provided for fabricating apparatus for use with a variety of surgical procedures associated with a patient's spine. Individuals who suffer degenerative disc disease, natural spine deformations, a herniated disc, spine injuries or other spine disorders often require surgery on the affected region to relieve the individual from pain and prevent further injury. Such spinal surgeries may involve removal of damaged joint tissue, insertion of a tissue implant and/or fixation of two or more adjacent vertebral bodies, with the surgical procedure varying depending on the nature and extent of the injury.

For patients with varying degrees of degenerative disc disease and/or nerve compression with associated lower back pain, spinal fusion surgery, or lumbar arthrodesis ("fusion") is commonly used to treat the degenerative disease. Fusion commonly involves distracting and/or decompressing one or more intervertebral spaces, followed by removing any associated facet joints or discs, and then joining or "fusing" two or more adjacent vertebra together. Fusion of vertebral bodies also commonly involves fixation of two or more adjacent vertebrae, which may be accomplished through introduction of rods or plates, and screws or other devices into a vertebral joint to join various portions of a vertebra to a corresponding portion on an adjacent vertebra.

Fusion may occur in the lumbar, thoracic or cervical spine region of a patient. Fusion requires tools for accessing the vertebrae and implanting the desired implant, any bioactive material, etc. Such procedures often require introduction of additional tools and/or instruments, including drills, drill guides, debridement tools, irrigation devices, vises, clamps, cannulae, retractors, distracters, cutting tools, cutting guides and other insertion/retraction tools and instruments. The insertion, alignment and placement of these tools, instruments and fixation devices are critical to the success of the operation. As such, providing a customized and patient-specific tool or instrument increases the likelihood that the surgical procedure will be successful.

Other benefits achieved from the use of these patient-specific cutting guides include: providing means to achieve quick and controlled removal of bone; providing spatial orientation of cutting tools used during the procedure; ensuring correct orientation of cuts, both through controlled guiding of the instrument and visualization during the pre-surgical planning process; providing accurate calculation of deformity correction, prior to cutting; providing accurate bone resection, which in turn ensures deformity correction; depth controlled cutting restrictions to protect neural and vascular elements; controlled cutting vector and avoiding contact or injury to neural elements; and ability to provide approach for cuts in a posterior, anterior, posterior lateral, transforaminal or direct lateral approach.

Each of the embodiments described herein may be provided in a modular (i.e., single level) or a monolithic (i.e., multilevel) configuration. Thus, for case of facilitating the description provided herein, certain embodiments have been shown in one (modular or monolithic) embodiment, but may be provided in a different (monolithic or modular) configuration without departing from the spirit of the disclosure. In various aspects, the monolithic embodiments may comprise anywhere from two to ten levels with respect to vertebral bodies, or enclose multiple locations of a patient's boney anatomy other than the spine. It is expressly understood that the embodiments described herein are for the purpose of illustrating certain embodiments of the disclosure, and are not intended to be limiting with respect to the scope of the disclosure.

The guide described herein preferably provides a surgeon with means to ensure proper location, trajectory, and depth of pilot holes through the underlying boney anatomy of a patient, such as for alignment and/or placement of fixation devices (i.e., screws). The guide may comprise a patient-contacting surface that is associated with an element of the guide other than the cannula (c). For example, the guide may comprise at least one footing or leg which comprises at least one patient-contacting surface. The patient specific surface can be specific to any portion of the patient's anatomy, as reflected in the captured patient data using any of the various methods described above.

The guide may further comprise a tab positioned on the opposite side of the guide from the patient-contacting surfaces. The tab may comprise a scoring, perforated surface or equivalent surface feature to improve purchase by a user's hand or fingers, and preferably provides a visible, manipulatable and ergonomic method for holding and directing the guide during use. The tab may also be used to translate forces from the user through the guide and into the patient contacting surfaces, including the clipping or hooking of the guide to anatomical features described below. Alternatively, the tab may comprise raised surface features, in lieu of scoring, and may further comprises extruded or shaped features to facilitate positioning and manipulation of the guide during a surgical procedure.

In embodiments, the cannulae are oriented and/or positioned in a specific location for placement of specific and/or patient-matched fixation or other devices. The cannulae of a particular guide may have different coloring, diameters, dimensions, heights, etc. to visually distinguish one from the other during surgery, and may comprise unique indicia to further aid in this distinction. The bores in the cannula may be depth specific to avoid under- of over-insertion of a particular device therethrough In embodiments, the patient-specific apparatus, as described herein, may be used in conjunction with particular robotic, navigational or motion control systems, including systems pertaining to fixation-related surgeries. More specifically, these guides may be used in conjunction with devices that employ automated or semi-automated manipulation. Embodiments of the present disclosure may be designed such that the apparatus may be formed and verified, for example, remotely by an operator, remotely by an operator through a computer controller, by an operator using proportioning devices, programmatically by a computer controller, by servo-controlled mechanisms, by hydraulically-driven mechanisms, by pneumatically-driven mechanisms or by piezoelectric actuators. It is expressly understood for purposes of this disclosure that other types of machinery other than rapid prototyping machinery may be employed in the systems and methods described herein, for example, by computerized numerical control (CNC) machinery.

The patient-specific apparatus, as described herein, may be used in conjunction with particular robotic, navigational, motion control or AR systems, including systems pertaining to fixation-related surgeries. For example, the apparatus described herein may be used in conjunction with an AR system for assisting with placement and orientation of a guide, including but not limited to the patient-matched guide described herein, during a particular surgical procedure.

The AR system may be employed with a physical guide adapted to be placed in at least one of the contact locations displayed by the AR system. One advantage to having a physical guide for use in conjunction with the AR system is that the physical guide may work regardless of movement between individual anatomical features, whereas use of a purely "virtual" system alone may not be accurate, particularly when there is movement following initial registration. Physical guides used in a surgical procedure will still have an image generated from patient-imaging data captured during the surgery and may be loaded into the AR's software or other configuration program for viewing by the surgeon.

The AR system of this embodiment may be utilized in conjunction with the one or more patient-specific guides to ensure proper alignment of the guides with the patient's anatomy, where contact locations of the guide will display on the actual boney anatomy so the surgeon can align the guide with the contact locations. Knowing the correct guide placement (of the physical guide) helps ensure adequate cleaning of soft tissue around the contact locations.

In addition, one or more trajectories may be displayed by way of the AR system, including through an associated peripheral imaging device, including those described below. These trajectories may be displayed with different indicia, colors, shapes or styles to indicate points of distinction from one trajectory and another trajectory, or alternatively the order or sequence of the trajectories. In this manner, the surgeon may utilize the one or more trajectories for guiding, for example, an instrument or an implant to the precise location shown by the imaging device.

The AR system may further comprise a peripheral imaging device, such as a headset or other wearable device, to permit the surgeon or other health professional view the images displayed by, for example, an associated AR program. Additional devices, such as handheld devices, voice activated devices, headphones, speakers, microphones, haptic devices and controls, holographic imaging equipment, visual displays (including without limitation on-glass display technologies such as Google Glass), and other components provided with AR systems may be supplied to facilitate the objectives described above. In this regard, U.S. Patent Publication Nos. 2020/0092462, 2020/0089314 and 2020/0082621, as well as Applicant's U.S. Pat. No. 10,580, 268 are hereby incorporated by reference in their entireties for the purpose of supplementing this disclosure, pursuant to 35 U.S.C. § 112.

In embodiments, the AR system may also display pre-surgically or post-surgically planned trajectories and/or cutting planes so that a surgeon can align actual instrumentation with the planned procedure, whether that procedure includes insertion of an instrument or implant or a cutting or removal operation. These trajectories of insertion or path of cuts may be virtually projected (similar to the projection of locations on the patient's boney anatomy) in a plane extending away from the patient's boney anatomy so that a surgeon can clearly see the intended path or placement of instrumentation. In this embodiment, the use and placement of a physical guide (and its associated mechanical constraints) helps to ensure proper pathway is followed.

In embodiments, the AR system described herein may facilitate placement of instruments or implantable devices. The system may be employed to ensure proper placement of plates, plates and rods, or rods alone, including the proper arcuate shape and any necessary bending of the rods used in a particular surgical procedure. The system may be used both pre-surgically and during the surgical procedure, as new registration and/or visualization data is captured by the system. For example, the system may be used for visualizing and executing planned osteotomy cuts or drilling of holes in the patient's boney anatomy, wherein the display of the system shows what areas and/or segments of bone need to be removed to make pre-surgically planned correction. As another example, the system may be used to show and facilitate execution of planned sagittal alignment (to aid in rod bending), or to show planned bone correction to help surgeon achieve desired amount. This example may be used to facilitate procedures on the patient's cervical spine as well.

The AR system described herein may also be configured to indicate where areas of critical anatomy are located (e.g. abdominal aorta, spinal cord, existing nerve roots), including those areas that are sought to be avoided. In this manner, the surgeon may be notified when an instrument or implant (or other device) is approaching a sensitive area to prevent injury. For example, when drilling a pilot hole, the AR system may be configured to compare the planned trajectory with the actual trajectory during the course of the surgical procedure and alert the surgeon that the trajectory deviates (e.g., becomes too medial/inferior/lateral/superior) from the planned trajectory. The use of alerts in this manner may also apply to desired cuts, instrument depth, etc. so that if the course of the surgical procedure does not closely match the planned procedure, the system will provide an alert and recommended correction. In certain embodiments, this deviation may be preset by the surgeon (e.g., by 5-8% or by a preset distance).

In still other embodiments, the system is configured to automatically send alerts when the actual procedure approaches one of the sensitive landmarks or deviates from the planned procedure. In still other embodiments, the system may display locations to avoid during the surgical procedure, such as a defined negative space relative to the targeted surgical site, or alternatively display radiation safe zones in a surgical suite or operating room, for example in relation to a C-arm. The system may also be configured to display sterile environments/instrumentation and send alerts if there is a change in state during a procedure. For example, if something is dropped or comes into contact with a non-sterile environment, the system could automatically change its display state to "non-sterile" or provide an equivalent alert.

In embodiments, a screw and/or instrument may also be subject to alerts, and the location of each determined by the AR system during use. In this manner, the system ensures the implanted screw or instrument is advanced in a correct trajectory and depth. The advancement and location of the screw or instrument may be displayed to the surgeon or other user via a wearable device, by way of example, and thereby provide the user with confirmation that the instrument and screw was placed correctly. In this manner, a surgeon may attach a patient-specific apparatus to multiple levels of the patient's spine that is impacted by a particular surgical procedure, and thereby provide markers for registration and orientation without having to rescan the patient throughout the surgery. In turn, the robotically guided surgical device may view the patient through the markers and align instrumentation controlled by the robotic equipment. This alignment may be achieved by any one of a combination of guides/markers/patient-specific orientation guides described herein.

Furthermore, the guides described herein may be provided with embedded locating/information markers. Thus, the robotic device(s) may orient robotically controlled instruments relative to a drill location and embedded information on each level a guide is present. In certain embodiments, such as with a prior fusion procedure, only one guide/locating marker would be needed. In some embodiments, the apparatus is 3D printed with metal or plastic material. In other embodiments, the apparatus is fabricated using one of the other methods described herein.

Autonomous and semi-autonomous systems may further comprise an adjustable, robotic arm assembly, which may be affixed to a piece of machinery, an operating surface or alternatively to the patient. The arm assembly may substantially facilitate the placement of surgical screws during spinal surgeries by securing the guide and corresponding coupling devices to a stationary surface, thereby providing greater stability and, in turn, more accurate placement of screws and/or other fixation devices. For example, a patient specific guide may be engaged with the corresponding patient specific anatomy of a desired surgical site. An adjustable arm assembly, which is secured to a stationary surface, such as an operating or side table or other surface, can then engage the guide via corresponding coupling devices to provide greater stability and delivery of fixation devices therethrough. This attachment between the device(s) and the arm assembly may permit a user to set and fix, for example, the sagittal angle of the device(s) when performing a surgical procedure on the patient's spine.

One having skill in the art will appreciate that embodiments of patient specific guides, as well as other embodiments discussed herein, may be used in conjunction with devices that employ automated or semi-automated manipulation, such as, for example, robotics, image guidance or other autonomous systems. Embodiments of patient specific guides may also be designed such that the guide may be operated and verified, in whole or in part, for example, remotely by an operator, remotely by an operator through a computer controller, by an operator using proportioning devices, programmatically by a computer controller, by servo-controlled mechanisms, by hydraulically-driven mechanisms, by pneumatically-driven mechanisms or by piezoelectric actuators. These apparatus and systems may be programmed to operate with the patient-specific guides, the same having known dimensions and therefore provide case of validation and operation by automated or semi-automated means.

In one embodiment discussed above, for example, the adjustable arm assembly may be associated with, or controlled by, a robot, programmable apparatus, CNC machinery or equivalent equipment used to perform a surgical procedure. In other embodiments, the guide may be configured for use in conjunction with or to further supplement the use of a navigation device. More specifically, autonomous placement of the patient specific guide via the adjustable arm assembly with the corresponding anatomical feature(s) of the patient assists with one or more of registration, stability, and motion tracking. The navigation device coupled with the adjustable arm assembly and/or patient-specific guide may optionally track the position of instruments, equipment or hardware in relation to the patient's anatomy during a surgical procedure. Accordingly, the navigation device may display positions of instruments, equipment or hardware as they are used during the surgical procedure. In yet other embodiments, the placement of the guide may supplement the registration, stability and motion tracking features provided by the navigation device. In these embodiments, such surgical procedures may be entirely or partly performed via autonomous or semi-autonomous systems and methods so as to limit the exposure of certain harmful or toxic chemicals or transmissions (e.g., radiation) to the surgeon and other attending medical staff. Such autonomous and semi-autonomous systems and methods may also substantially increase the speed and accuracy of the surgical procedure.

In one embodiment, the guides described herein are designed following acquisition of a scan of the patient's anatomy with a medical imaging device. The scan may be performed by a CT scanner, an MRI scanner, or any other medical imaging device. The scan is segmented into 3D models of each vertebra. These 3D models are then modified in CAD to simulate the correction desired by the surgeon. Once the desired correction is appropriately simulated, a guide is generated that will allow the surgeon to make the planned corrections intraoperatively. The guides may then be manufactured through 3D printing, rapid prototyping, or an alternative method for creating patient-specific features.

The guides of the present disclosure can be used as physical cutting guides, drill guides, bone removal guides, implant guides, screw guides, instrument guides or guides for other surgical equipment or instrumentation. Additionally, the guides may be used as an aid to indicate to surgeons the angle and location of drilling or cuts so that neural elements in the patient's spine or vertebral arteries are not harmed. The guides may also be used pre-surgically on models of the patient's anatomy to test or practice the planned surgical procedure. At least a portion of the proximal end of the guide is configured to extend outside of the patient during a surgical procedure.

In one embodiment, at least a portion the guide is reusable. Optionally, at least a portion of the guides projects beyond the patient's anatomy when in a position of use during a surgical procedure. For example, at least a proximal portion of a cannulae of one or more of the guides may project from an incision formed during surgery.

Additionally, the patient-specific guides may comprise individual pieces that are adapted to be assembled by a surgeon before, or during, a surgical procedure. The portions or components of the guides may be disassembled and delivered to a specific area of the patient's anatomy for assembly during the surgical procedure. For example, the bodies, cannulae, and legs of the guides may pass through a bore of a cannula of another tool and assembled during a minimally invasive surgical procedure.

The cannula described herein may be configured to contact, by way of example but not limitation, one or more of the lamina, pars interarticularis, aspects of the transverse process, the inferior articular process, the spinous process and the superior articular process of the patient. Cutouts (not illustrated) may be formed on a portion of the cannulae to prevent the guide from contacting the spinous process of the patient, adjacent vertebrae, or to avoid other patient anatomy.

The cannulae may have a generally cylindrical or oval shape but other shapes are contemplated. Each one of a pair of cannulae may have a unique orientation and size. The cannulae may be of any length and differ from one cannula to another cannula provided with the apparatus, based at least in part on the specific patient's anatomical features, preferences of the surgeon, orientation of the guide, and the type of tool or fixation device associated with the cannulae. The length of the cannulae may also be selected to provide depth control of instruments guided by the cannulae. For example, in one embodiment, the cannulae has a first length to allow a drill bit to penetrate a first depth into the patient's anatomy. In another example, the cannulae has a second length that is greater than the first length. Accordingly, the cannulae prevents the drill bit from penetrating the first depth into the patient's anatomy.

The cannulae may optionally include extensions of any size or shape. In one embodiment, the extensions are positioned proximate to a distal end of the cannulae. In another embodiment, the extensions wrap at least partially around the exterior of the cannulae. The extensions may also project at least partially beyond the distal end of the cannulae. The extensions are adapted to wrap at least partially around a predetermined portion of the patient's anatomy. In one embodiment, the extensions are adapted to wrap around a portion of one of the pars and the superior articular process.

In one embodiment of the present disclosure, the bore of the cannulae may facilitate and guide a drill bit, or any other suitable instrument to drill and tap a pilot hole in any one or more of the trajectories described herein. After the pilot hole is created, the bore may further guide insertion of a fixation device into the pilot hole. In another embodiment of the present disclosure, the bore may be adapted to receive one or more inserts or guide wires.

Various benefits achieved from the use of these patient-specific guides include: providing means to achieve quick and controlled removal of bone; providing spatial orientation of cutting tools used during the procedure; ensuring correct orientation, both through controlled guiding of the instrument and visualization during the pre-surgical planning process; providing accurate calculation of deformity correction, prior to operating; providing accurate bone resection, which in turn ensures deformity correction; depth controlled or hard stop restrictions to protect neural and vascular elements; controlled cutting or insertional vectors and avoiding contact or injury to neural elements; and ability to provide approach for cuts or implantation in a posterior, anterior, posterior lateral, transforaminal or direct lateral approach.

Additionally, the guides described herein facilitate quicker bone removal and instrumentation of the patient's boney anatomy, decreasing surgical time and associated risk to the patient. These guides also increase the accuracy of procedures performed using the guide by providing patient matched surfaces to conform to a predetermined alignment of the guide with respect to the patient's anatomy. In this manner, the guides decrease the amount of fluoroscopy required to verify or correct the alignment of the guide, decreasing radian expose to medical staff as well as the patient.

Although embodiments are described and in certain figures shown as one piece, it will be appreciated that in other embodiments the guide could include multiple pieces or a series of guides that are placed in a specific order to generate a series of operations or actions. In embodiments of guides comprising multiple pieces, each piece of the guide may be keyed to interconnect in a specific order and location to other pieces of the guide. In one embodiment, the guide does not contact the patient's anatomy. In another embodiment, at least a portion of the guide is adapted to contact the patient's anatomy.

Although the devices described above have been illustrated for use with certain guide screws and/or instruments, it is expressly understood that the devices may be used with a variety of other implantable and non-implantable apparatus, including by way of example, lateral mass screws. Other screws and instruments may be used with the surgical devices described above without departing from the spirit of the disclosure and are considered to be within the scope of the appended claims.

The apparatus described herein may facilitate the introduction of Kirschner wire (K-wire) that may be visualized through various imaging systems known in the art, and which may further be used to identify a desired patient-specific marker or location. Such procedure may also allow for successful dilation through the introduction of sequential muscle or soft tissue dilators, which may allow for a quicker, more effective operation. The use of such apparatus, as discussed above, may also prevent the need of additional surgical devices, such as multiple retractors of various sizes, which may substantially reduce the logistics and cost of preparation of an operation.

Other embodiments of the present disclosure may include patient specific insertional guides that may include patient-specific contours or channels that conform to anatomical markers. Such patient specific insertional guides may be used for the placement of external hardware or guide surgical equipment or instrumentation for percutaneous and/or subcutaneous introduction, which may be predetermined using medical imaging and/or computer aided design software as described in conjunction with the systems and methods disclosed herein. In such procedures, the external hardware and/or surgical equipment may be guided via the patient-specific contours or channels by location, axes and/or insertional trajectories, and/or depth to substantially ensure accuracy. In these embodiments, hardware or instrumentation is substantially guided during surgery via predetermined patient-specific anatomical markers on a surgical area of interest. Said another way, at the time of surgery the guide may be placed at a predetermined surgical location, either percutaneously or subcutaneously, that can then direct and facilitate the operation by way of accurate introduction of external hardware or guided surgical equipment or instrumentation. Such procedures may also substantially guarantee the safety and reliability of the procedure.

The models, templates and other patient-specific or patient-matched apparatus described herein may be manufactured by any known method of manufacture, or by methods developed after the date of this disclosure. In one embodiment, models are manufactured using a rapid manufacturing process such as 3D printing, although other processes are contemplated. The models can be fit to the patient's anatomy during surgery to help the surgeon visualize the correct angles and starting locations for cuts, inserting drills or other surgical instruments, or introducing an implant, such as a plate or screw. In one embodiment, the models include at least one cannula. The cannula(e) may be adapted to receive fixtures to at least temporarily interconnect the model to portions of the patient's anatomy. Fixtures may also be received in the cannula to interconnect portions of a modular model together.

One having skill in the art will appreciate that embodiments of patient specific guides, as well as other embodiments discussed herein, may be used in conjunction with devices that employ automated or semi-automated manipulation, such as, for example, robotics, image guidance or other autonomous systems. Embodiments of patient specific guides may also be designed such that the guide may be operated and verified, in whole or in part, for example, remotely by an operator, remotely by an operator through a computer controller, by an operator using proportioning devices, programmatically by a computer controller, by servo-controlled mechanisms, by hydraulically-driven mechanisms, by pneumatically-driven mechanisms or by piezoelectric actuators. These apparatus and systems may be programmed to operate with the patient-specific guides, the same having known dimensions and therefore provide case of validation and operation by automated or semi-automated means.

In one embodiment discussed above, for example, the adjustable arm assembly may be associated with, or controlled by, a robot, programmable apparatus, CNC machinery or equivalent equipment used to perform a surgical procedure. In other embodiments, the guide may be configured for use in conjunction with or to further supplement the use of a navigation device. More specifically, autonomous placement of the patient specific guide via the adjustable arm assembly with the corresponding anatomical feature(s) of the patient assists with one or more of registration, stability, and motion tracking. The navigation device coupled with the adjustable arm assembly and/or patient-specific guide may optionally track the position of instruments, equipment or hardware in relation to the patient's anatomy during a surgical procedure. Accordingly, the navigation device may display positions of instruments, equipment or hardware as they are used during the surgical procedure. In yet other embodiments, the placement of the guide may supplement the registration, stability and motion tracking features provided by the navigation device. In these embodiments, such surgical procedures may be entirely or partly performed via autonomous or semi-autonomous systems and methods so as to limit the exposure of certain harmful or toxic chemicals or transmissions (e.g., radiation) to the surgeon and other attending medical staff. Such autonomous and semi-autonomous systems and methods may also substantially increase the speed and accuracy of the surgical procedure.

Other benefits achieved from the use of these patient-specific guides of all embodiments of the present disclosure include: providing means to achieve quick and controlled removal of bone; providing spatial orientation of cutting tools used during the procedure; ensuring correct orientation of cuts, both through controlled guiding of the instrument and visualization during the pre-surgical planning process; providing accurate calculation of deformity correction, prior to cutting; providing accurate bone resection, which in turn ensures deformity correction; depth controlled cutting restrictions to protect neural and vascular elements; controlled cutting vector and avoiding contact or injury to neural elements; and ability to provide approach for cuts in a posterior, anterior, posterior lateral, transforaminal or direct lateral approach.

One having skill in the art will appreciate that embodiments of the present disclosure may have various sizes. The sizes of the various elements of embodiments of the present disclosure may be sized based on various factors including, for example, the anatomy of the patient, the person or other device operating with or otherwise using the apparatus, the surgical site location, physical features of the devices and instruments used with the devices described herein, including, for example, width, length and thickness, and the size of the surgical apparatus.

Embodiments of the present disclosure present several advantages over the prior art including, for example, the speed and efficacy of the procedure, the minimally invasive aspects of the procedure, the disposability of the prototype devices, the ability to introduce customized implements or tools to the surgical site with minimal risk and damage to the surrounding tissue, lower risk of infection, more optimally placed and/or oriented guides and implantable devices, a more stable and controlled method of placing and inserting of apparatus associated with the surgical procedure further reducing the likelihood of the apparatus becoming misaligned or dislodged, and fewer and/or less expensive tools and instruments in a surgical site, among other advantages. For example, the embodiments reduce the number and need for multiple trays, instruments and different size devices used in a particular surgery, thereby reducing the cost of the equipment necessary to complete the surgery. The embodiments also reduce the cumulative radiation exposure to both the surgeon and medical professionals in the operating environment and the patient.

Additionally, the guides facility quicker bone removal and instrumentation of the patient's boney anatomy, decreasing surgical time and associated risk to the patient. The guides also increase the accuracy of procedures performed using the guide by providing patient matched surfaces to conform to a predetermined alignment of the guide with respect to the patient's anatomy. In this manner, the guides decrease the amount of fluoroscopy required to verify or correct the alignment of the guide, decreasing radian expose to medical staff as well as the patient.

One having skill in the art will appreciate that embodiments of the present disclosure may be constructed of materials known to provide, or predictably manufactured to provide the various aspects of the present disclosure. These materials may include, for example, stainless steel, titanium alloy, aluminum alloy, chromium alloy, and other metals or metal alloys. These materials may also include, for example, PEEK, carbon fiber, ABS plastic, polyurethane, polyethylene, photo-polymers, polyamide, resins, particularly fiber-encased resinous materials rubber, nylon, latex, synthetic rubber, synthetic materials, polymers, and natural materials.

With respect to the embodiments described above, it is expressly understood that such embodiments may be incorporated for use in practicing the novel methods described herein. In certain embodiments, those methods may comprise greater or fewer steps than as described above. By way of example, but not limitation, one step for use with the various embodiments described above may comprise the use of various technologies for capturing a patient's unique morphology, and subsequently mapping and/or planning the fabrication of a device comprising one or more "patient matched" surfaces or features for complementing that unique morphology. Further, such devices may be further optimized with respect to the unique data associated with the patient, such that the device may be matched with specific devices for use during the surgical procedure, or oriented around the patient's own anatomy to achieve, for example, one or more desired insertional trajectories (which may be verified in a pre-operative setting). Variations on this step, and the inclusion or exclusion of additional steps described herein are expressly contemplated by the present disclosure.

According to various embodiments described herein, the patient-matched apparatus may further comprise desired axes and/or insertional trajectories. According to embodiments, the patient-matched apparatus may be further matched with at least other apparatus used during the surgical procedure. The apparatus may be configured to receive markers or may include markers embedded within the guide, the position of which (relative to the patient-contacting and other elements/components of the guide) are easily registered and determined by the autonomous or augmented equipment employed during the procedure. Other features of the disclosure will become apparent after a review of the following disclosures and varying embodiments of the disclosure.

The guide preferably provides a surgeon with means to ensure proper location, trajectory, and depth of pilot holes through bone, such as for alignment and/or placement of a plate and associated fixation devices (i.e., screws). The patient specific surface can be specific to any portion of the patient's anatomy, as reflected in the captured patient data using any of the various methods described above in the Summary.

In one embodiment, the attachment points comprise slots to receive extensions of the cannulae. In one embodiment, the slots may also direct the path of a blade or other cutting instrument, or to receive a measurement aid or tool for facilitating the surgeon/user in identifying landmarks, surrounding boney anatomy, placement of implanted devices, or for surgical planning.

The guide may also include indicia to identify a sequence of use or portions of the patient's anatomy with which the guide is to be used. The indicia may also indicate a tool to be used, a direction of a cut to be performed, or a planned orientation or alignment of the guide. According to one embodiment, the guide may further comprise one or more indicia for identifying the guide with a particular patient.

The patient specific surfaces may include any number of protrusions, depressions, and contours to substantially conform to the patient's anatomy. For example, the patient specific surfaces may comprise multiple portions that are adapted to contact two different planes formed by two distinct portions of the patient's anatomy. The patient specific surfaces are adapted to one or more of: align the insert in a predetermined position with respect to the patient's anatomy; hook around a portion of the patient's anatomy; prevent unintended or inadvertent movement of the insert during a surgical procedure; and displace soft tissue. In one embodiment, the patient specific surfaces comprise relatively thin extensions to displace soft tissue. By protruding at least partially around and substantially conforming to different portions of the patient's anatomy, the patient specific surfaces generally "hook" at least partially around (or to) the patient's anatomy. Thus, the surfaces may contact at least two different planes formed by distinct surfaces of the patient's anatomy. Accordingly, the insert is adapted to at least partially fit and substantially conform to predetermined portions of one or more vertebrae during the surgical procedure.

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims. For further illustration, the information and materials supplied with the provisional and non-provisional patent applications from which this application claims priority are expressly made a part of this disclosure and incorporated by reference herein in their entirety.

Additionally, although the surgical devices of the present disclosure are particularly well-suited for implantation into the spinal column between two target vertebrae, and although much of the discussion of the present disclosure is directed toward their use in spinal applications, advantages offered by embodiments of the present disclosure may also be realized by implantation at other locations within a patient where the fusion of two or more bony structures may be desired. As one of skill in the art will appreciate, the present disclosure has applications in the general field of skeletal repair and treatment, with particular application to the treatment of spinal injuries and diseases. It should be appreciated, however that the principles of the present disclosure can also find application in other areas.

It is expressly understood that where the term "patient" has been used to describe the various embodiments of the disclosure, the term should not be construed as limiting in any way. For instance, a patient could be either a human patient or an animal patient, and the apparatus and methods described herein apply equally to veterinary science as they would to surgical procedures performed on human anatomy. The apparatus and methods described herein therefore have application beyond surgical procedures used by spinal surgeons, and the concepts may be applied to other types of "patients" and procedures without departing from the spirit of the present disclosure.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

The present inventions, in various embodiments, include components, methods, processes, systems and/or apparatuses substantially as depicted and described herein, including various embodiments, subcombinations, and subsets thereof. Those of skill in the art will understand how to make and use the present inventions after understanding the present disclosure. The present inventions, in various embodiments, include providing devices and processes in the absence of items not depicted and/or described herein or in various embodiments hereof, including in the absence of such items as may have been used in previous devices or processes, e.g., for improving performance, achieving ease and/or reducing cost of implementation.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computer-implemented method for planning patient-specific spine surgical correction, comprising the steps of:
    obtaining patient imaging data, the imaging data including at least A/P and Lateral radiographic images and a 3D imaging dataset;
    creating a virtual model by segmenting at least one bone in the 3D imaging dataset;
    assigning reference geometry to each segmented bone to define different parts of anatomy;
    creating a 3D weight-bearing virtual model that consists of segmentation from the 3D imaging dataset by:
    calibrating at least one of the A/P and Lateral radiographic images to the CT scan;
    determining whether all anatomy required to measure spinopelvic parameters is not included in the 3D imaging dataset;
    segmenting at least one bone that was not included in the 3D imaging dataset;
    aligning the segmented bones in 3D space from the 3D imaging dataset to the A/P and Lateral radiographic images;
    measuring pre-operative parameters on the 3D weight-bearing virtual model by using the reference geometry assigned to the segmented bones;
    providing the virtual model to the surgeon including measurements for the surgeon;
    receiving input from the surgeon the desired surgical procedure to be performed and surgical goals from that procedure;
    modifying the weight-bearing virtual model based on surgeon input of planned surgical procedure to create an operative plan virtual model representative of the surgeon's desired surgical procedure and surgical goals;

analyzing the operative plan virtual model for acceptability and further modifying the model if the operative plan virtual model is not acceptable;

designing one or more implants to fit the virtual model; and presenting the operative plan virtual model to the surgeon as a surgical plan for approval.

2. The method of claim 1, wherein the imaging data is a synthetic CT, MRI, CT, or CTA Scan and erect A/P and erect lateral x-rays.

3. The method of claim 1, wherein the imaging data is a standing synthetic CT, MRI, CT, or CTA Scan.

4. The method of claim 1, wherein the weight bearing images are standing, seated, or lying x-rays based on the patient's mobility condition.

5. The method of claim 1, wherein the segmented bones are selected from the list comprising a vertebra (C1-L5), a full pelvis, a partial pelvis, a full femur, and a partial femur.

* * * * *